United States Patent
Kubo et al.

(10) Patent No.: US 7,999,653 B2
(45) Date of Patent: Aug. 16, 2011

(54) PLANT MONITOR-CONTROL APPARATUS

(75) Inventors: Yoji Kubo, Yokohama (JP); Norihiro Uchida, Kokubunji (JP); Yoshifumi Koganemaru, Tama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 993 days.

(21) Appl. No.: 11/861,917

(22) Filed: Sep. 26, 2007

(65) Prior Publication Data

US 2008/0033588 A1 Feb. 7, 2008

Related U.S. Application Data

(63) Continuation of application No. PCT/JP2007/051194, filed on Jan. 25, 2007.

(30) Foreign Application Priority Data

Jan. 26, 2006 (JP) ................................. 2006-017303

(51) Int. Cl.
*G05B 19/00* (2006.01)

(52) U.S. Cl. ............... 340/5.2; 340/825.29; 340/825.23; 340/3.9; 340/10.5

(58) Field of Classification Search ............. 340/825.29, 340/825.23, 825.39, 10.5; 702/191
See application file for complete search history.

(56) References Cited

U.S. PATENT DOCUMENTS 6,845,453 B2 * 1/2005 Scheidt et al. ..................... 726/5
7,636,030 B2 * 12/2009 Weingarth et al. ........... 340/5.74

FOREIGN PATENT DOCUMENTS

| JP | 9-189582 | | 7/1997 |
|----|----|----|----|
| JP | 11-328119 | A | 11/1999 |
| JP | 2001-067113 | A | 3/2001 |
| JP | 2001-125602 | A | 5/2001 |
| JP | 2002-366248 | A | 12/2002 |
| JP | 2003-102069 | A | 4/2003 |
| JP | 2003-295943 | A | 10/2003 |
| JP | 2004-170459 | A | 6/2004 |
| JP | 2004-171283 | A | 6/2004 |
| JP | 2005-011125 | A | 1/2005 |

* cited by examiner

*Primary Examiner* — Vernal U Brown
(74) *Attorney, Agent, or Firm* — Oblon, Spivak, McClelland, Maier & Neustadt, L.L.P.

(57) ABSTRACT

A plant monitor-control apparatus includes a control device which controls a to-be-controlled device of a plant, an operation/monitor device which delivers an operation instruction to the plant, operates the plant via the control device and monitors the plant, and a user skill level management device which manages respective user skill levels and determines an operation authority corresponding to each user skill level.

14 Claims, 25 Drawing Sheets

| User name | System 1 | System 2 | ... | Operation | Weight |
|---|---|---|---|---|---|
| User 1 | State A | State C | ... | a1 | 1/50 |
| User 1 | State A | State C | ... | a2 | 49/50 |
| User 1 | State A | State D | ... | a3 | 2/2 |
| User 1 | State B | State C | ... | b4 | 1/2 |
| User 1 | State B | State C | ... | a5 | 1/2 |
| User 1 | State B | State D | ... | a6 | 3/3 |
| ... | ... | ... | ... | ... | ... |

FIG. 9

| User name | System 1 | System 2 | ... | Operation | Weight |
|---|---|---|---|---|---|
| User 1 | State A | State C | ... | a1 | 2/51 |
| User 1 | State A | State C | ... | a2 | 49/51 |
| User 1 | StateA | State D | ... | a3 | 2/3 |
| User 1 | State A | State D | ... | b1 | 1/3 |
| User 1 | State A | State D | ... | a3 | 2/2 |
| User 1 | State B | State C | ... | a4 | 1/2 |
| User 1 | State B | State C | ... | a5 | 1/2 |
| User 1 | State B | State D | ... | a6 | 3/3 |
| ... | ... | ... | ... | ... | ... |

FIG. 10

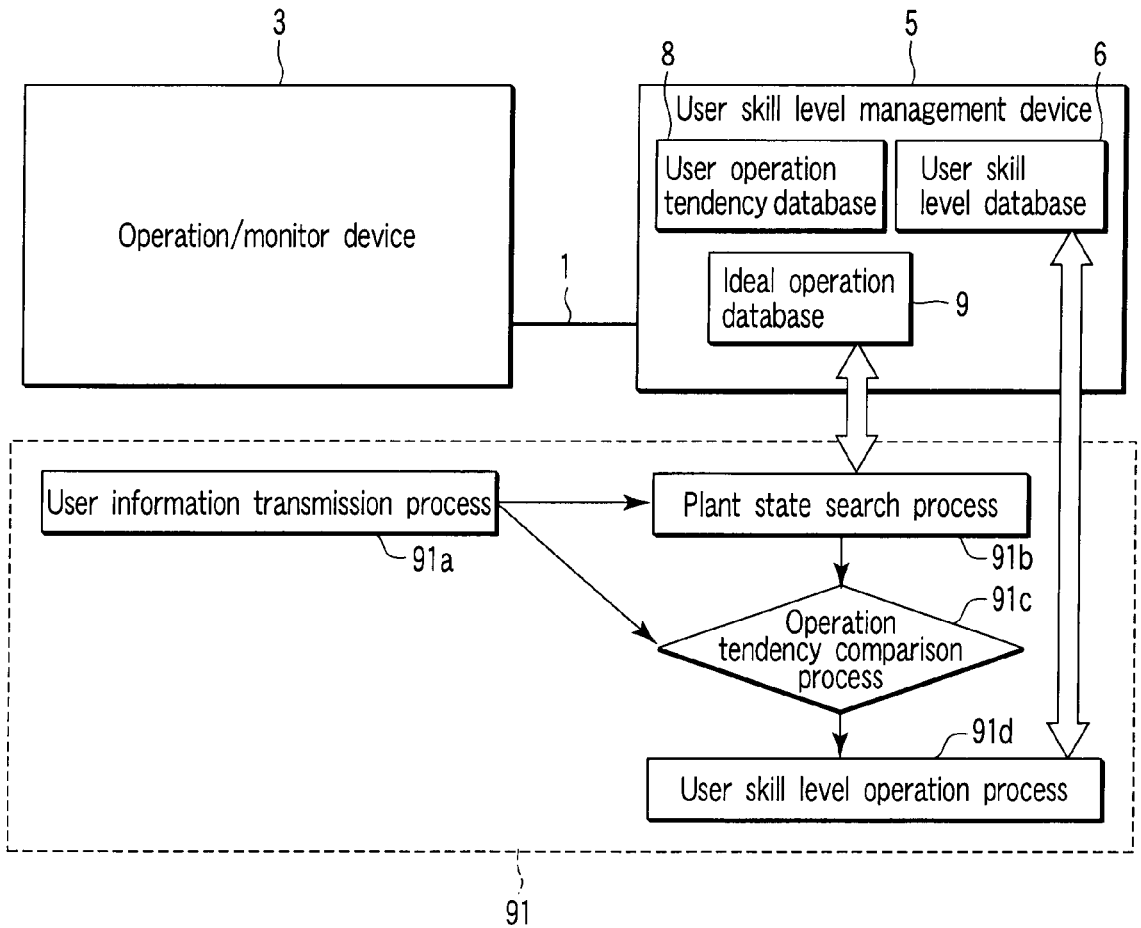
F I G. 13

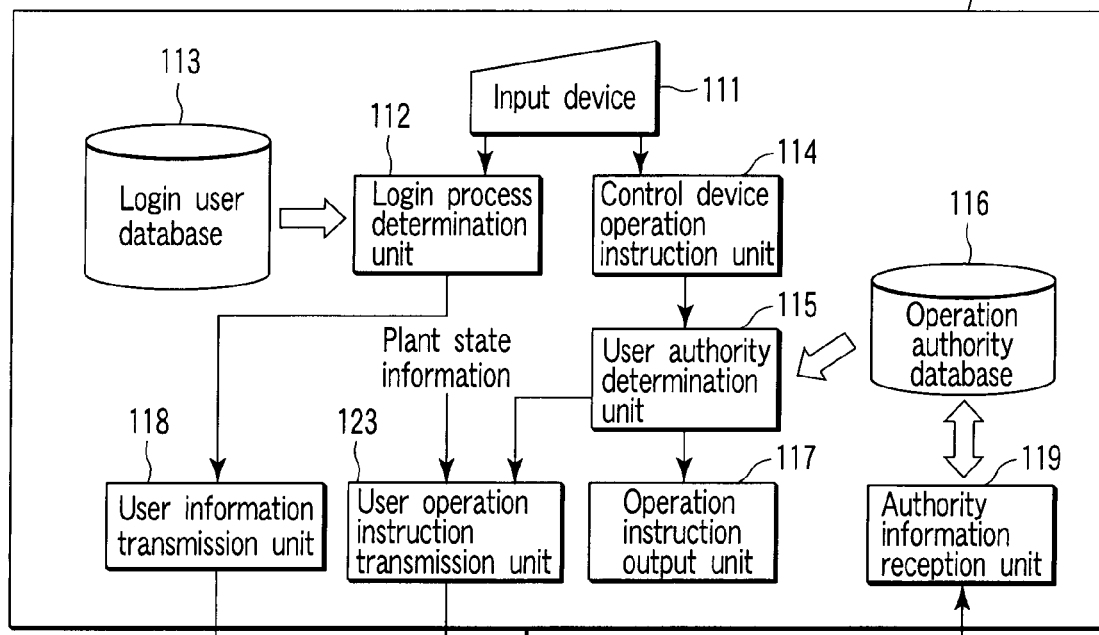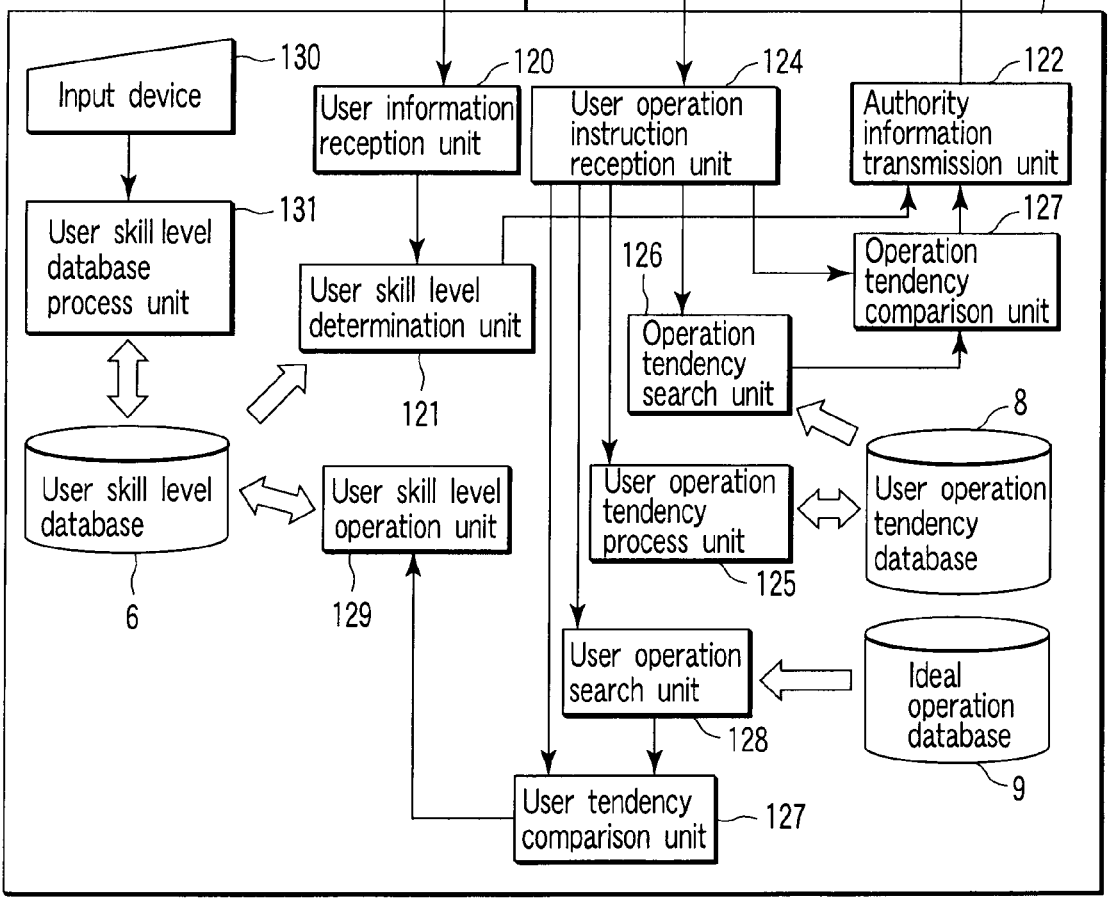
FIG. 14

| System 1 | System 2 | ... | Operation | Importance degree | Next state | |
|---|---|---|---|---|---|---|
| State A | State C | ... | a1 | 3 | State A | State D |
| State A | State C | ... | a2 | : | State B | State C |
| State A | State D | ... | a3 | 3 | State B | State D |
| State A | State D | ... | a1 | -2 | State B | State D |
| State B | State C | ... | a5 | : | State B | State D |
| State B | State C | ... | a6 | -8 | State B | State E |
| State B | State D | ... | a7 | 10 | State B | State E |
| State B | State E | ... | ... | ... | ... | ... |
| ... | ... | ... | ... | ... | ... | ... |

FIG. 15

| System 1 | System 2 | Operation |
|---|---|---|
| State A | State C | a1(3) |
| State A | State D | a3(3) |
| State B | State D | a7(10) |
| State B | State E | |

FIG. 16

| System 1 | System 2 | Operation |
|---|---|---|
| State A | State C | a2(1) |
| State B | State C | a6(-8) |
| State B | State E | |

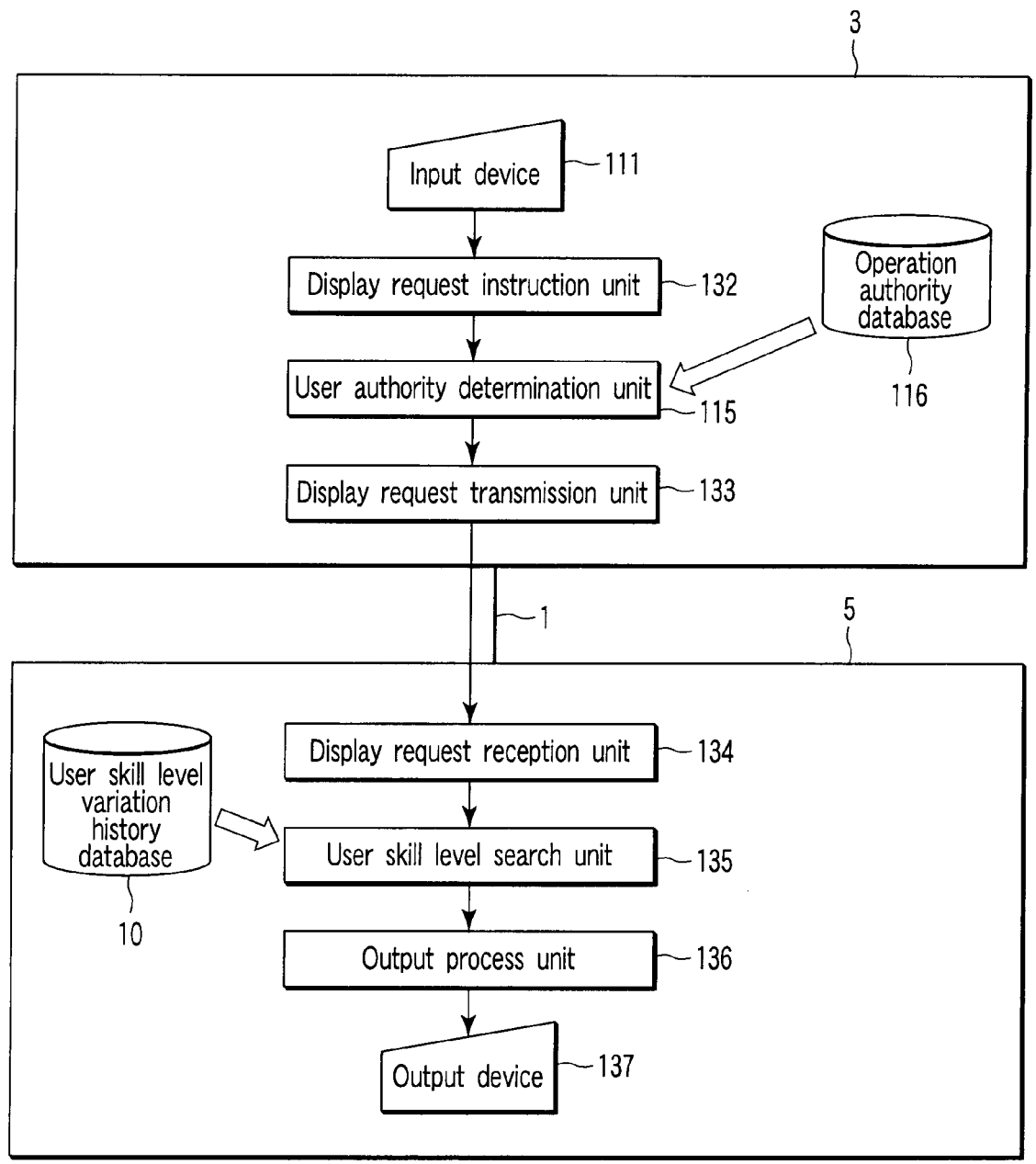
F I G. 23

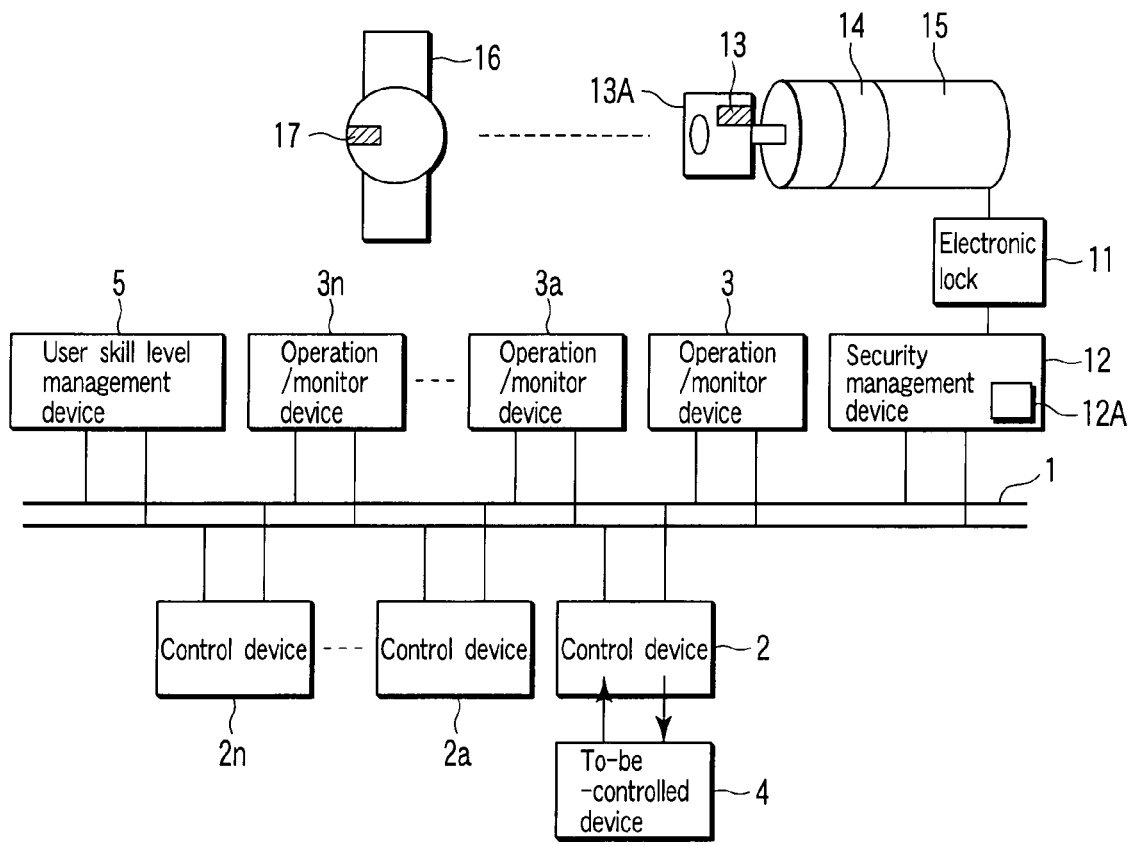
F I G. 34
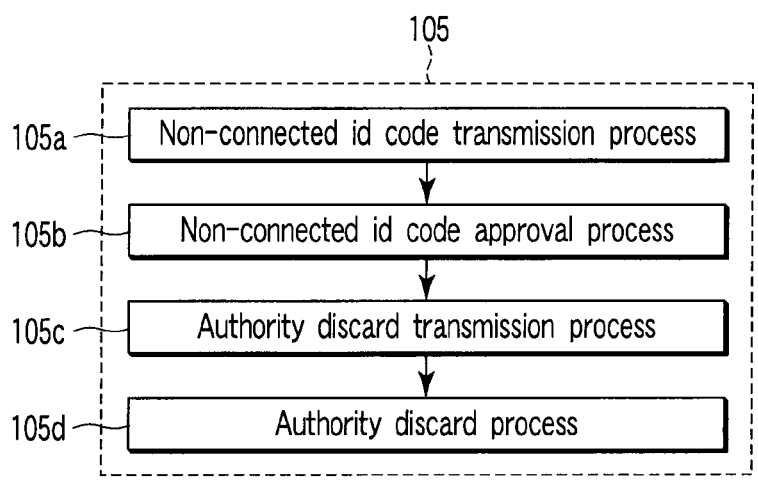
F I G. 35

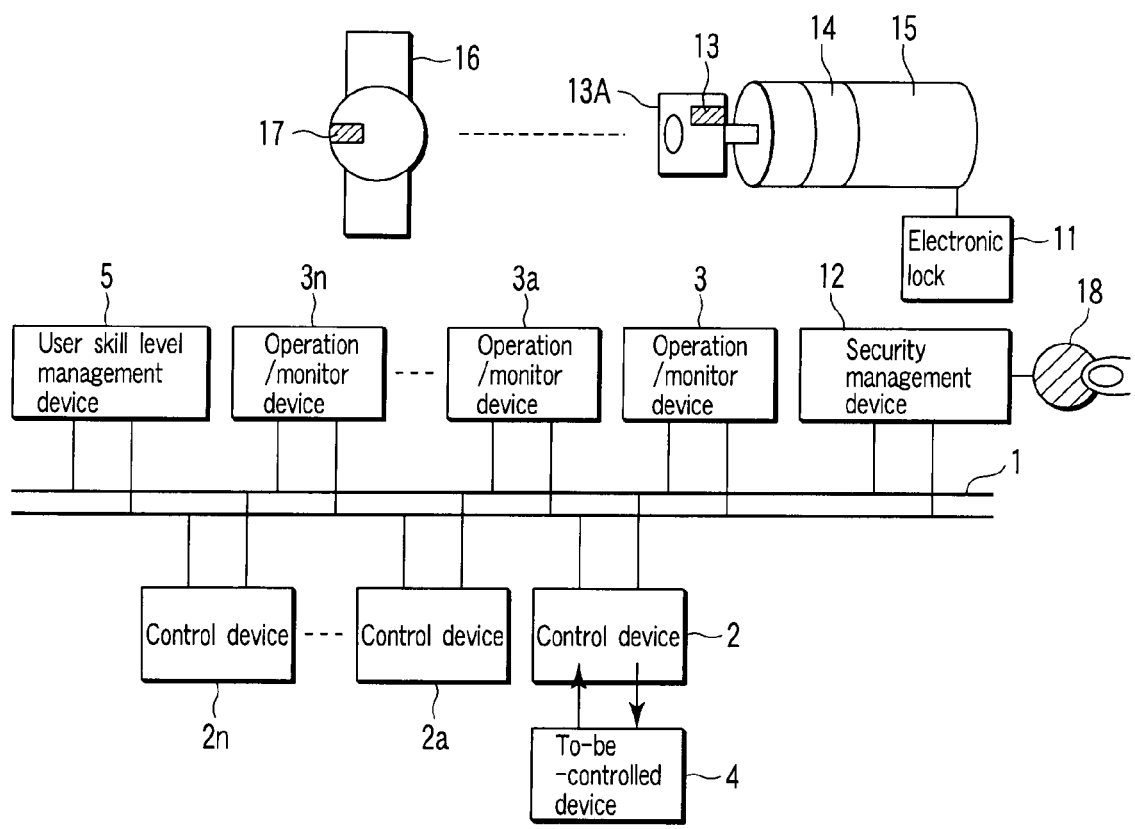
F I G. 36

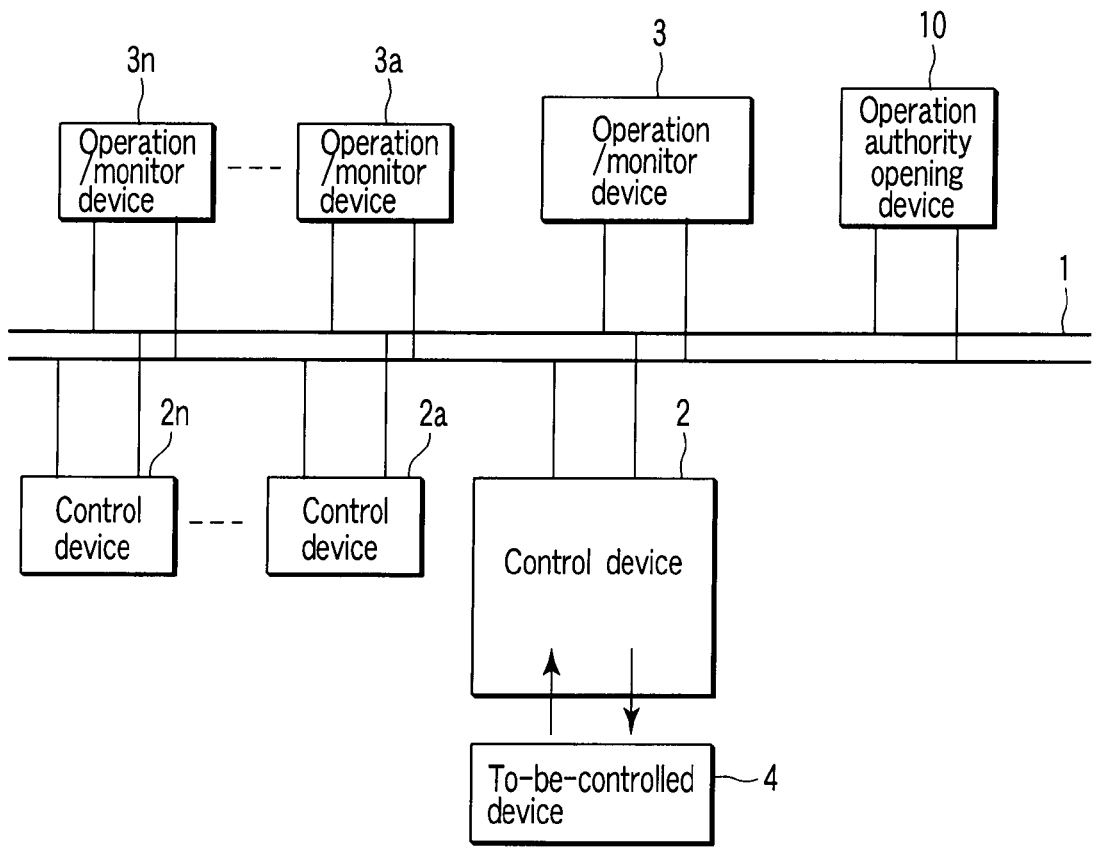
F I G. 37
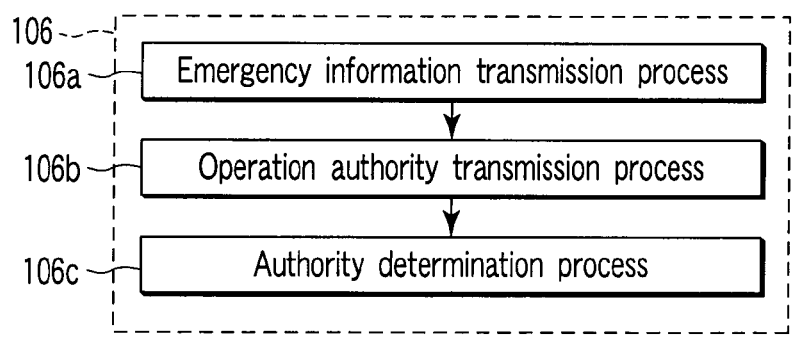
F I G. 38

PLANT MONITOR-CONTROL APPARATUS

CROSS REFERENCE TO RELATED APPLICATIONS

This is a Continuation Application of PCT Application No. PCT/JP2007/051194, filed Jan. 25, 2007, which was published under PCT Article 21(2) in Japanese.

This application is based upon and claims the benefit of priority from prior Japanese Patent Application No. 2006-017303, filed Jan. 26, 2006, the entire contents of which are incorporated herein by reference.

BACKGROUND OF THE INVENTION

1. Field of the Invention

The present invention relates to a plant monitor-control apparatus which monitors and controls a plant.

2. Description of the Related Art

In general, a plant monitor-control apparatus includes a control device which controls a device to be controlled in a plant, and an operation/monitor device. An operation instruction is delivered from the operation/monitor device to the plant via the control device. Thereby, the to-be-controlled device of the plant is operated, and the plant is monitored.

FIG. 39 is a block diagram showing an example of the plant monitor-control apparatus. In FIG. 39, a plurality of control devices 2 to 2n and a plurality of operation/monitor devices 3-3n are connected to a network 1. A to-be-controlled device 4 is connected to each of the control devices 2 to 2n. FIG. 39 shows the case in which the to-be-controlled device 4 is connected to the control device 2.

In the plant monitor-control apparatus with the above structure, the to-be-controlled device 4 is operated by any one of the operation/monitor devices 3 to 3n. In this case, an operation instruction from the operation/monitor device is sent to one of the control devices 2 to 2n via the network 1. In FIG. 39, the operation instruction is output from the control device 2 to the to-be-controlled device 4. The state information of the to-be-controlled device 4 is input to the control device 2 from the to-be-controlled device 4, and is displayed on the operation/monitor device, 3-3n, via the network 1.

As regards the security in this plant monitor-control apparatus, in general, switching from a prohibition state to a permission state or from the permission state to the prohibition state can be executed by inputting a password for operation permission/prohibition in the system. In addition, the permission/prohibition of the device operation can be switched in units of an operation/monitor device.

There is a technique in which various data and operation/monitor information, which are handled by a control device, are monitored, and abnormality is reported to a plant operation/monitor device (see, e.g. Patent Document 1).

Patent Document: Jpn. Pat. Appln. KOKAI Publication No. 9-189582

BRIEF SUMMARY OF THE INVENTION

In the conventional plant monitor-control apparatus, however, only the security by means of the password is provided, and there is a possibility that an erroneous operation or a serious accident may occur by an operation by a person who does not have sufficient knowledge. In addition, a serious accident may be caused if the apparatus is operated by an illegal intruder or a third person while an operator is away from the desk.

The object of the invention is to provide a plant monitor-control apparatus which can prevent an erroneous operation or a serious accident due to an operation by a person with insufficient knowledge or by an illegal intruder.

According to a first invention of the present invention, there is provided a plant monitor-control apparatus comprising: a control device which controls a to-be-controlled device of a plant; an operation/monitor device which outputs an operation instruction of the to-be-controlled device to the control device; and a user skill level management device which outputs, to the operation/monitor device, authority information which defines a range of operations of the plant corresponding to a user skill level of a user of the operation/monitor device, wherein the operation/monitor device includes means for outputting login user information, which indicates the user who completes login, to the user skill level management device, the user skill level management device includes: a user skill level database which stores, in an associated manner, user information, skill level information indicative of a skill level of an operation by the user, and the authority information corresponding to the skill level information; and authority information transmission means for searching the user skill level database by using the login user information, acquiring the authority information corresponding to the login user information, and transmitting the acquired authority information, together with the login user information, to the operation/monitor device, and the operation/monitor device further includes: an operation authority database which stores the user information and the authority information in an associated manner; means for searching the operation authority database by using the login user information, and acquiring operation authority information corresponding to the login user information of the user who inputs the operation instruction; and means for determining whether the input operation instruction meets the range of operations of the plant, which is defined by the operation authority information that is acquired from the operation authority database, and outputting the operation instruction to the control device in a case where it is determined that the input operation instruction meets the range of operations of the plant.

According to a second invention of the present invention, there is provided the plant monitor-control apparatus according to the first invention, wherein the operation/monitor device further includes user operation instruction transmission means for transmitting to the user skill level management device the input operation instruction, the login user information and plant state information indicative of a state of the plant at a time when the user executes an operation, and the user skill level management device further includes: a user operation tendency database which stores the user information, a plant state, the operation instruction and a frequency of the operation instruction in an associated manner; and user operation tendency process means for updating the frequency stored in the user operation tendency database, on the basis of the operation instruction, the login user information and the plant state information, which are transmitted by the user operation instruction transmission means.

According to a third invention of the present invention, there is provided the plant monitor-control apparatus according to the second invention, wherein the user skill level management device further includes: operation tendency search means for acquiring, from the user operation tendency database, the operation instruction, the login user information and the plant state information which are transmitted from the user operation instruction transmission means; and operation tendency comparison means for determining whether the acquired frequency is a predetermined threshold or less, the authority information transmission means transmits, in a case where it is determined that the acquired frequency is the predetermined threshold or less, the login user information and authority discard information for discarding the authority information in the operation authority database to the operation/monitor device, and the operation/monitor device discards, in a case where the transmitted authority discard information is received, the authority information, which corresponds to the login user information transmitted together with the authority discard information, from the operation authority database.

According to a fourth invention of the present invention, there is provided the plant monitor-control apparatus according to the second invention, wherein the user skill level management device further includes an ideal operation database which stores, in an associated manner, the plant state information indicative of the state of the plant, the operation instruction corresponding to the plant state information, and importance degree information indicative of an importance degree of the operation instruction corresponding to the plant state information; means for searching the ideal operation database, and acquiring the importance degree which is associated with a series of operation instructions input by the user and the plant state information indicative of the state of the plant at the time when the user inputs the operation instruction, and which corresponds to the series of operation instructions; and means for changing the skill level information in the user skill level information database, which corresponds to the user who inputs the series of operation instructions, on the basis of the acquired importance degree.

According to a fifth invention of the present invention, there is provided the plant monitor-control apparatus according to the first invention, wherein the operation/monitor device further includes means for outputting a user skill level display request including the user information, which requests display of the user skill level information, and the user skill level management device further includes: a user skill level variation history database which stores the user information and a history of the user skill level information in an associated manner; means for receiving the user skill level display request from the operation/monitor device, searching the user skill level variation history database, and acquiring the history of the user skill level information corresponding to the user information included in the user skill level display request; and means for displaying the acquired history of the user skill level information.

According to a sixth invention of the present invention, there is provided the plant monitor-control apparatus according to the first invention, wherein the operation/monitor device further includes means for outputting a plural user skill level display request including plural user information, which requests display of the user skill level information, and the user skill level management device further includes: means for receiving the plural user skill level display request from the operation/monitor device, searching the user skill level database, and acquiring skill levels of a plurality of users corresponding to the plural user information included in the plural user skill level display request; and means displaying the acquired skill levels of the plurality of users.

According to a seventh invention of the present invention, there is provided the plant monitor-control apparatus according to the second invention, wherein the operation/monitor device further includes means for outputting a plural user operation tendency display request including plural user information and a plant state, display of which is desired, and the user skill level management device further includes: means for receiving the plural user operation tendency display request from the operation/monitor device, searching the user operation tendency database, and acquiring the frequency of the operation instruction corresponding to the plural user information in the plant state included in the received plural user operation tendency display request; and means for displaying, with respect to each user, the acquired frequency of the operation instruction corresponding to the plural user information.

According to an eighth invention of the present invention, there is provided a plant monitor-control apparatus comprising: a control device which controls a to-be-controlled device of a plant; an operation/monitor device which outputs an operation instruction of the to-be-controlled device to the control device; and a security management device which includes a database which stores, in an associated manner, identification information and authority information indicating a range of operable to-be-controlled devices, and which reads identification information pre-recorded in an electronic circuit buried in an input key, determines whether the read identification information agrees with the identification information stored in the database, and outputs, when the agreement of the identification information is determined, the authority information, which is stored in association with the identification information the agreement of which is determined, to the operation/monitor device, wherein the operation/monitor device outputs to the control device only the operation instruction which meets the authority information output from the security management device.

According to a ninth invention of the present invention, there is provided the plant monitor-control apparatus according to the eighth invention, wherein the read of the identification information, which is pre-recorded in the electronic circuit buried in the input key, is executed in a case where the identification information, which is pre-recorded in the electronic circuit buried in the key, agrees with identification information recorded in another information device.

According to a tenth invention of the present invention, there is provided the plant monitor-control apparatus according to the ninth invention, wherein the security management device further includes means for outputting, in a case where the identification information, which is pre-recorded in the electronic circuit buried in the key, is not received for a predetermined time period, the unreceivable identification information and authority discard information, which instructs discard of the operation authority of the unreceivable identification information, to the operation/monitor device, and the operation/monitor device further includes means for discarding, in a case where the unreceivable identification information and the authority discard information are received from the security management device, the authority information, which is associated with the unreceivable identification information, from the database.

According to an eleventh invention of the present invention, there is provided the plant monitor-control apparatus according to the eighth invention, wherein the security management device further includes: a biometric authentication sensor which acquires biometric authentication data of a user; means for converting biometric information, which is acquired by the biometric authentication sensor, to identification information; and means for determining whether the converted identification information agrees with the identification information stored in the database, and outputting, in a case where the agreement of the identification information is determined, the authority information, which is stored in association with the identification information the agreement of which is determined, to the operation/monitor device.

According to a twelfth invention of the present invention, there is provided the plant monitor-control apparatus according to the first invention, wherein the operation/monitor device outputs emergency state information in a case where an emergency state of the plant is detected, the plant monitor-control apparatus further comprises an operation authority opening device which outputs, in a case where the emergency state information that is output from the operation/monitor device is received, authority information, which indicates permission of only a predetermined safe operation, to the operation/monitor device, and the operation/monitor device further includes means for rewriting, in a case where the authority information is received from the operation authority opening device, the operation authority information, which is stored in the operation authority database, to the authority information which indicates permission of only the predetermined safe operation.

BRIEF DESCRIPTION OF THE SEVERAL VIEWS OF THE DRAWING

FIG. 9 shows an example of the record content of a user operation tendency database prior to an operation;

FIG. 10 shows an example of the record content of the user operation tendency database prior to an operation;

FIG. 13 shows the structure of a plant monitor-control apparatus according to a fourth embodiment of the present invention;

FIG. 14 is a detailed block diagram showing the structures of an operation/monitor device and a user skill level management device in the plant monitor-control apparatus according to the fourth embodiment of the present invention;

FIG. 15 shows the content of an ideal operation database;

FIG. 16 shows the relationship between plant states and operation instructions that are input;

FIG. 23 is a detailed block diagram showing the structures of an operation/monitor device and a user skill level management device in the plant monitor-control apparatus according to the fifth embodiment of the present invention;

FIG. 34 shows the structure of a plant monitor-control apparatus according to a tenth embodiment of the present invention;

FIG. 35 is a flow chart illustrating the operation of a security management device in the tenth embodiment of the present invention;

FIG. 36 shows the structure of a plant monitor-control apparatus according to an eleventh embodiment of the present invention;

FIG. 37 shows the structure of a plant monitor-control apparatus according to a twelfth embodiment of the present invention;

FIG. 38 is a flow chart illustrating the operation of an operation authority opening device 19 in the twelfth embodiment of the present invention.

DETAILED DESCRIPTION OF THE INVENTION

First Embodiment

Figure 1:
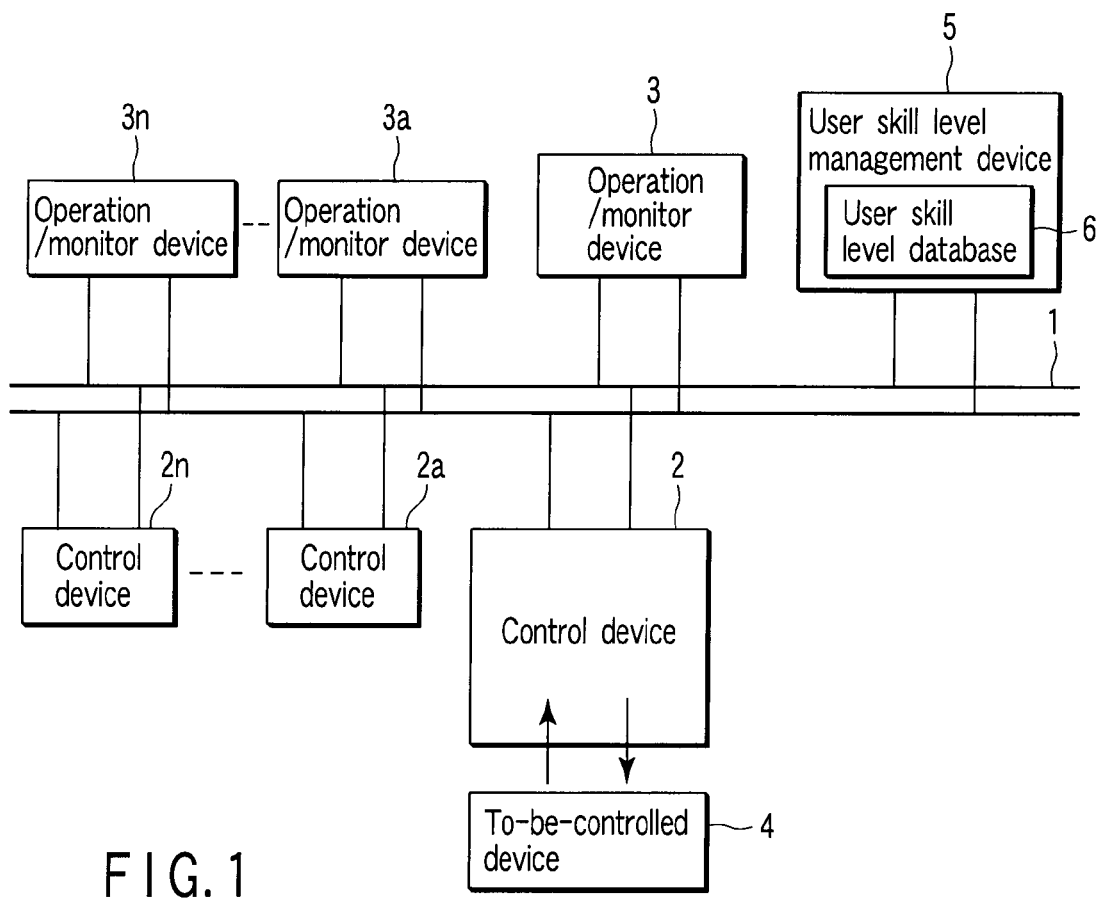
FIG. 1 shows the structure of a plant monitor-control apparatus according to a first embodiment of the present invention.

FIG. 1 shows the structure of a plant monitor-control apparatus according to a first embodiment of the present invention.

Figure 39:
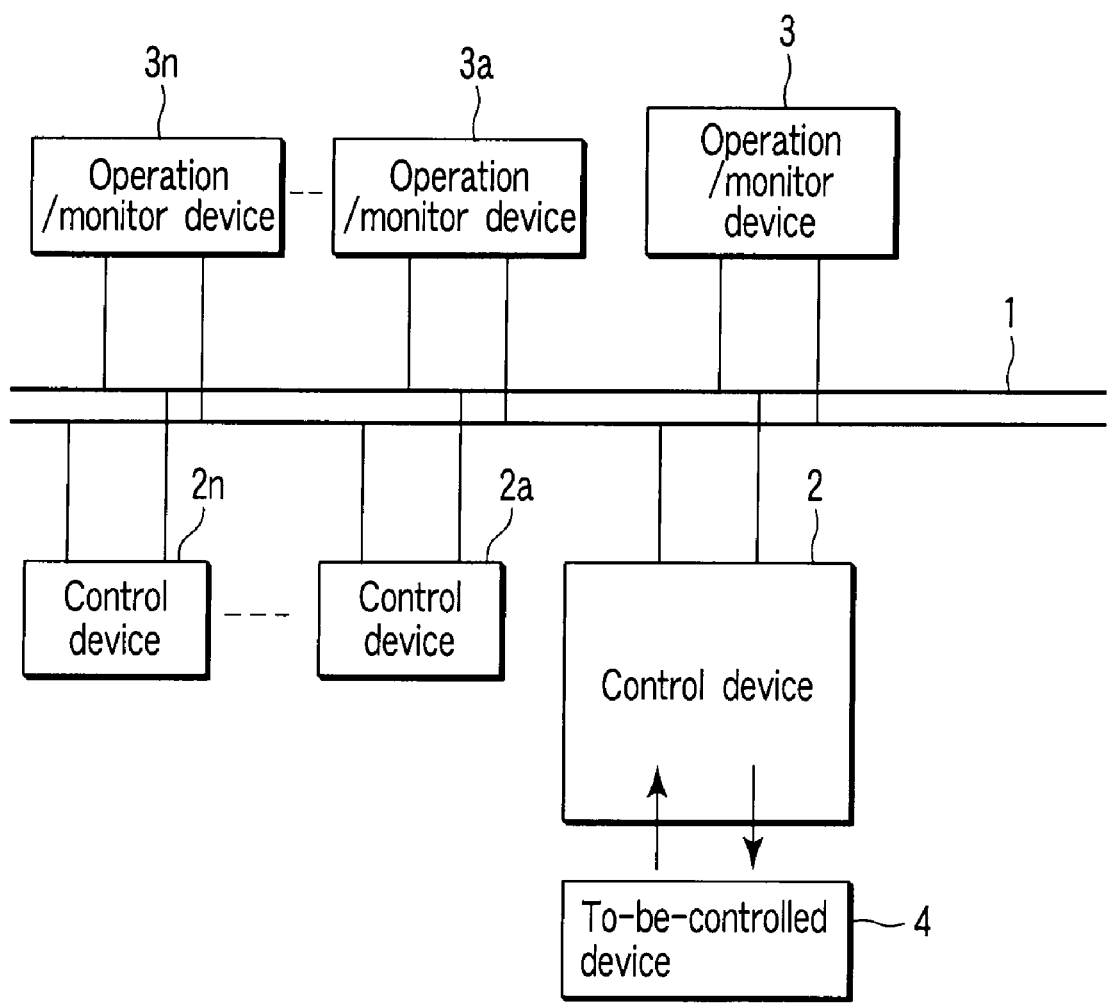
FIG. 39 shows the structure of an example of a conventional plant monitor-control apparatus.

In the first embodiment, a user skill level management device 5 including a user skill level database 6 is added to the prior art shown in FIG. 39. The components common to those in FIG. 39 are denoted by like reference numerals, and an overlapping description is omitted.

In FIG. 1, a plurality of control devices 2 to 2n and a plurality of operation/monitor devices 3 to 3n are connected to a network 1. Further, the user skill level management device 5 is connected to the network 1. The user skill level management device 5 includes the user skill level database 6, manages respective user skill levels, and determines the operation authority corresponding to the user skill level.

Figure 2:
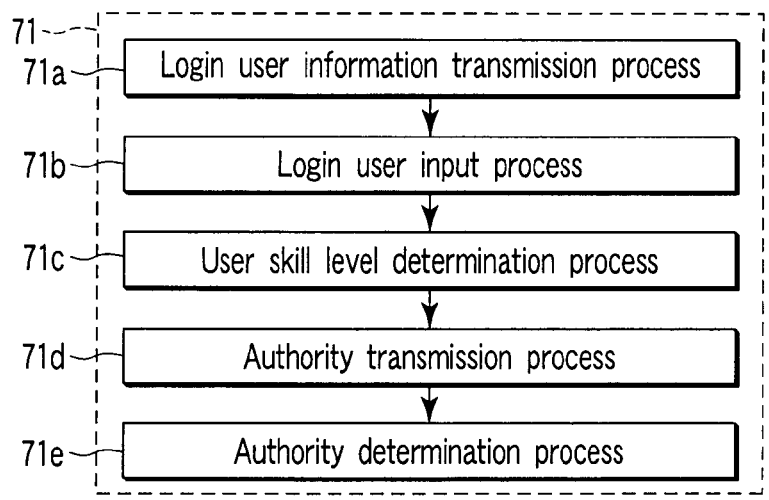
FIG. 2 is a flow chart illustrating the operation of the plant monitor-control apparatus according to the first embodiment of the present invention.

FIG. 2 is a flow chart illustrating the operation of the plant monitor-control apparatus according to the first embodiment of the present invention. In the plant monitor-control apparatus according to the first embodiment, a process according to a user skill level management flow 71 is executed. Specifically, a login user information transmission process 71a, a login user input process 71b, a user skill level determination process 71c, an authority transmission process 71d and an authority determination process 71e are executed.

Figure 3:
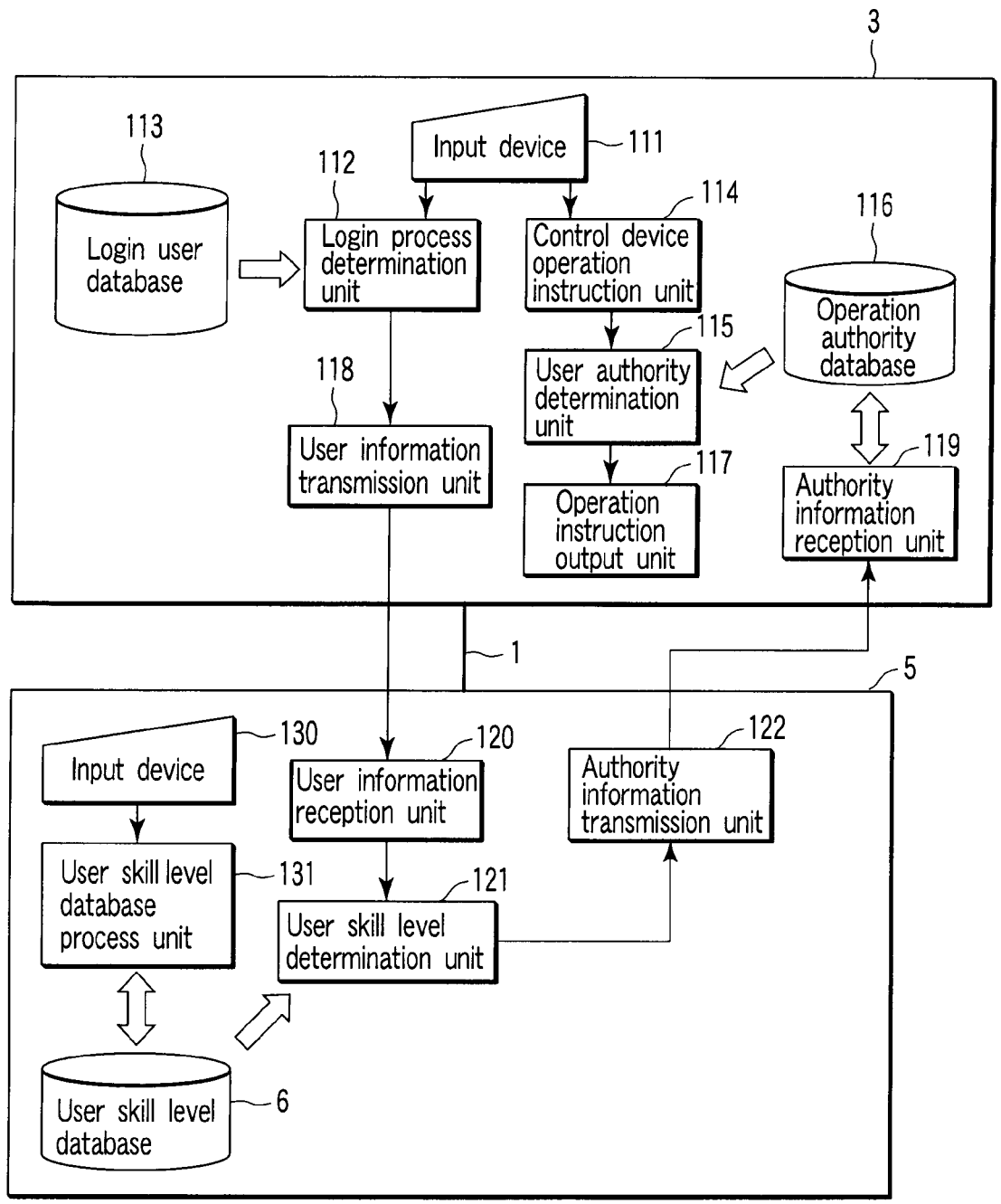
FIG. 3 is a detailed block diagram showing parts of the plant monitor-control apparatus according to the first embodiment of the present invention.

FIG. 3 is a detailed block diagram showing the structures of the operation/monitor device 3 and user skill level management device 5 in the plant monitor-control apparatus according to the first embodiment of the present invention. The operation/monitor device 3 comprises an input device 111, a login process determination unit 112, a login user database 113, a control device operation instruction unit 114, a user authority determination unit 115, an operation authority database 116, an operation instruction output unit 117, a user information transmission unit 118, and an authority information reception unit 119. The user skill level management device 5 comprises a user skill level database 6, a user information reception unit 120, a user skill level determination unit 121, an authority information transmission unit 122, an input device 130, and a user skill level database process unit 131.

Assume now that a user has logged into the operation/monitor device, 3 to 3n, through the input device 111. The login process determination unit 112 executes a login process by referring to the login user database 113. Specifically, the login user database 113 stores user information (user ID) and a password in an associated manner. When the user information and password, which are input from the input device 111, agree with the user information and password stored in the login user database 113, login is successfully completed. Thereafter, the process of the user skill level management flow 71 shown in FIG. 2, namely, the series of processes from the login user information transmission process 71a to the authority determination process 71e, are executed.

Figure 4:
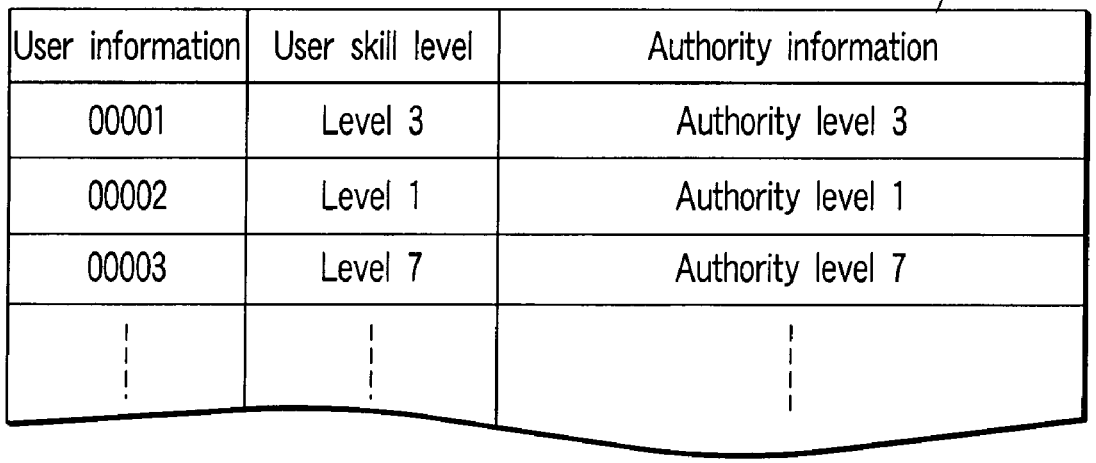
FIG. 4 shows the structure of a user kill level database.
Figure 5:
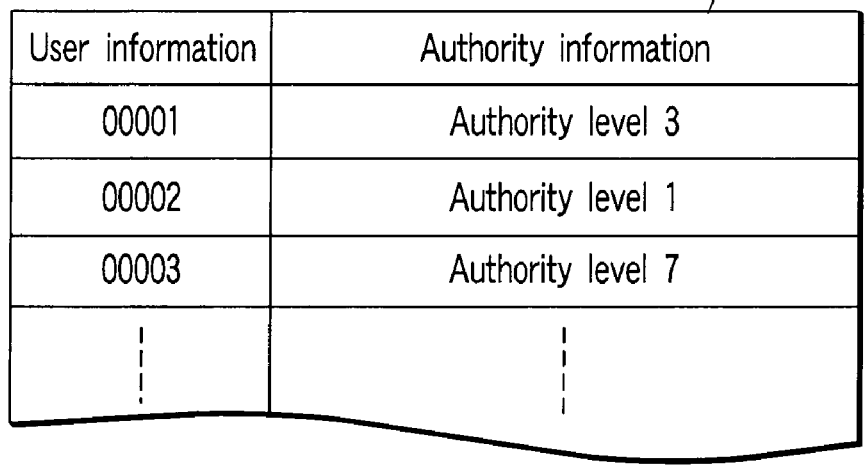
FIG. 5 shows a user operation authority database.

If the login is successfully completed, the login user information transmission process 71a carried out to send the user information, with respect to which the login has been completed, from the user information transmission unit 118 to the user skill level management device 5. In the user skill level management device 5, the user information reception unit 120 executes the login user input process 71b. In the login user input process 71b, the login user is determined. Then, the user skill level determination unit 121 executes the user skill level determination process 71c, and determines the user skill level and authority information corresponding to the user skill level, by referring to the user skill level database 6. As shown in FIG. 4, the user skill level database 6 stores user information, a user skill level and authority information in an associated manner. The "skill level" is information that defines, for example, the level of the user, and the "authority information" is information that defines, for example, the range of systems that are operable by the user. In the case of FIG. 4, the skill level and the authority information are associated in one-to-one correspondence. However, the association between the skill level and authority information is not limited to this example, and single authority information may be assigned to a plurality of skill levels. Using the user information that is received by the user information reception unit 120, the user skill level determination unit 121 searches the user skill level database 6 and acquires the associated user skill level and authority information. Thereafter, the authority information transmission unit 122 executes the authority transmission process 71d, and the authority information, which is determined by the user skill level determination process 71c, is transmitted, together with the user information, to the operation/monitor device, 3 to 3n, via the network 1. In the operation/monitor device, 3 to 3n, the authority information reception unit 119 executes the authority determination process 71e, and sets the received authority information in the operation authority database 116 in association with the user information. Thereby, the operation authority, which is usable by the user, is determined. FIG. 5 shows the operation authority database 116. As shown in FIG. 5, the authority information and user information, which have been sent from the user skill level management device 5, are stored in an associated manner in the operation authority database 116.

When the user operates the to-be-controlled device through the input device 111, the control device operation instruction unit 114 recognizes the operation of the to-be-controlled device. Then, the user authority determination unit 115 confirms the presence/absence of the operation authority by referring to the operation authority database 116. If the user has the authority, an operation instruction is output from the operation instruction output unit 117. Specifically, the user authority determination unit 115 searches the operation authority database 116 and acquires the associated authority information by using the user information of the user who has output the control operation instruction, and determines whether the operation instruction agrees with the operation authority that is defined by the acquired operation authority information. If it is determined that the operation instruction agrees with the operation authority, the operation instruction is output from the operation instruction output unit 117. If it is determined that the operation instruction does not agree with the operation authority, the operation instruction is not output.

For example, assume the case in which "user 00001" of "authority level 3" has output an operation instruction in connection with a device of a system D. In this case, if it is assumed that the operation of only systems A and B is permitted by the authority level 3, this operation instruction does not agree with the authority level, and thus the operation instruction is not output. In this description, the authority level defines the system. However, various settings of the authority level are possible. For instance, the authority level may define not only the system but also the state of the plant, the device and the time period. The editing of the user skill level database 6 can be executed by the user skill level database process unit 131 through the input device 130 in the user skill level management device 5.

The user skill level management device 5 and user skill level database 6 may be included in the operation/monitor device, 3 to 3m. Besides, only the user skill level database 6 may be configured as a separate system.

According to the first embodiment, since the user skill level management device 5 permits only the operation corresponding to the user skill level, an erroneous operation can be prevented.

Second Embodiment

Figure 6:
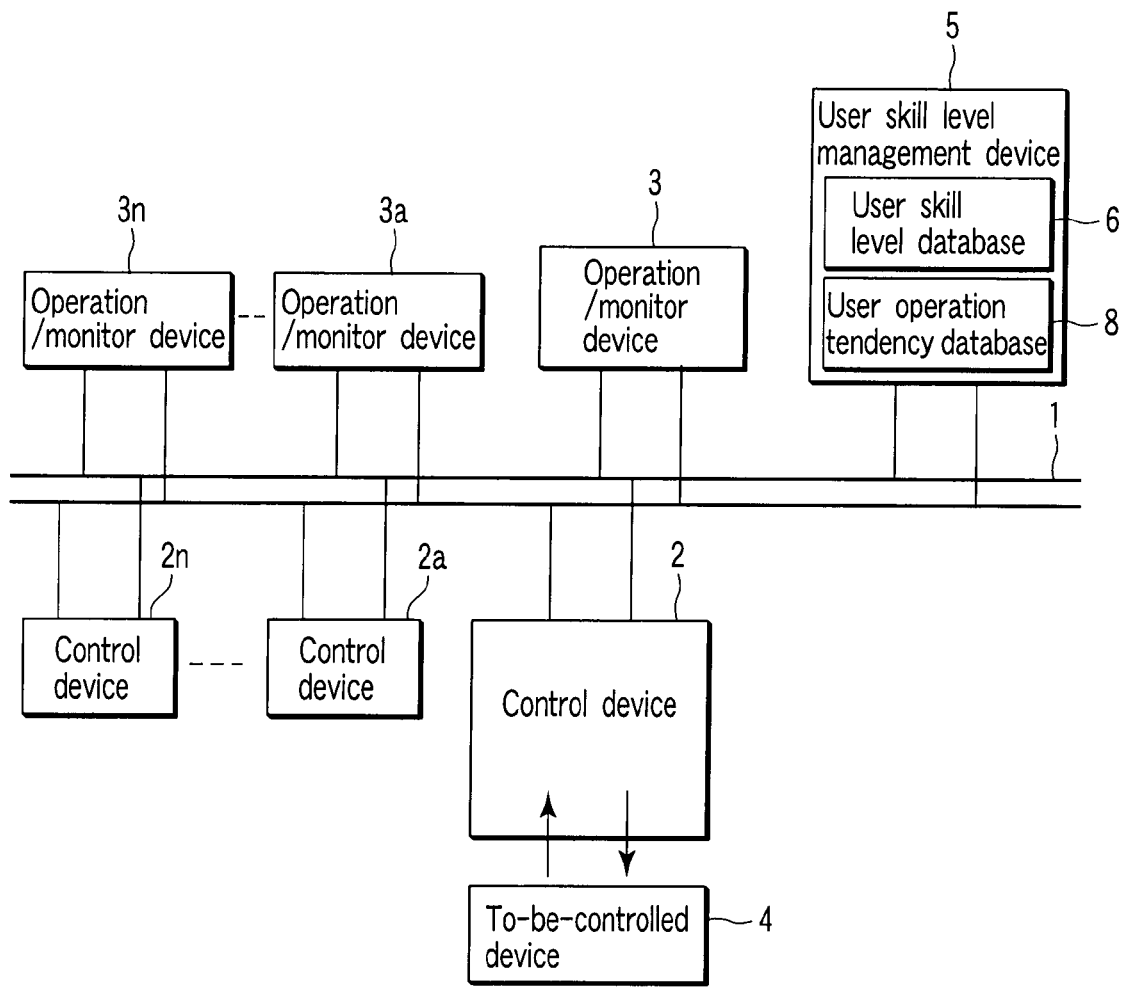
FIG. 6 shows the structure of a plant monitor-control apparatus according to a second embodiment of the present invention.

FIG. 6 shows the structure of a plant monitor-control apparatus according to a second embodiment of the present invention. In the second embodiment, a user operation tendency database 8 is additionally provided in the user skill level management device 5 in the first embodiment shown in FIG. 1. The user skill level management device 5 stores an operation tendency relating to each of operators. The components common to those in FIG. 1 are denoted by like reference numerals, and an overlapping description is omitted.

Figure 7:
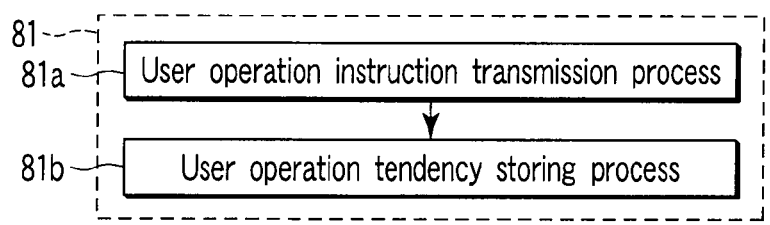
FIG. 7 is a flow chart illustrating the operation of the plant monitor-control apparatus according to the second embodiment of the present invention.

FIG. 7 is a flow chart illustrating the operation of the plant monitor-control apparatus according to the second embodiment of the present invention. In the plant monitor-control apparatus according to the second embodiment, a process according to a user operation tendency storing process flow 81 is executed. Specifically, a user operation instruction transmission process 81a and a user operation tendency storing process 81b are executed.

Figure 8:
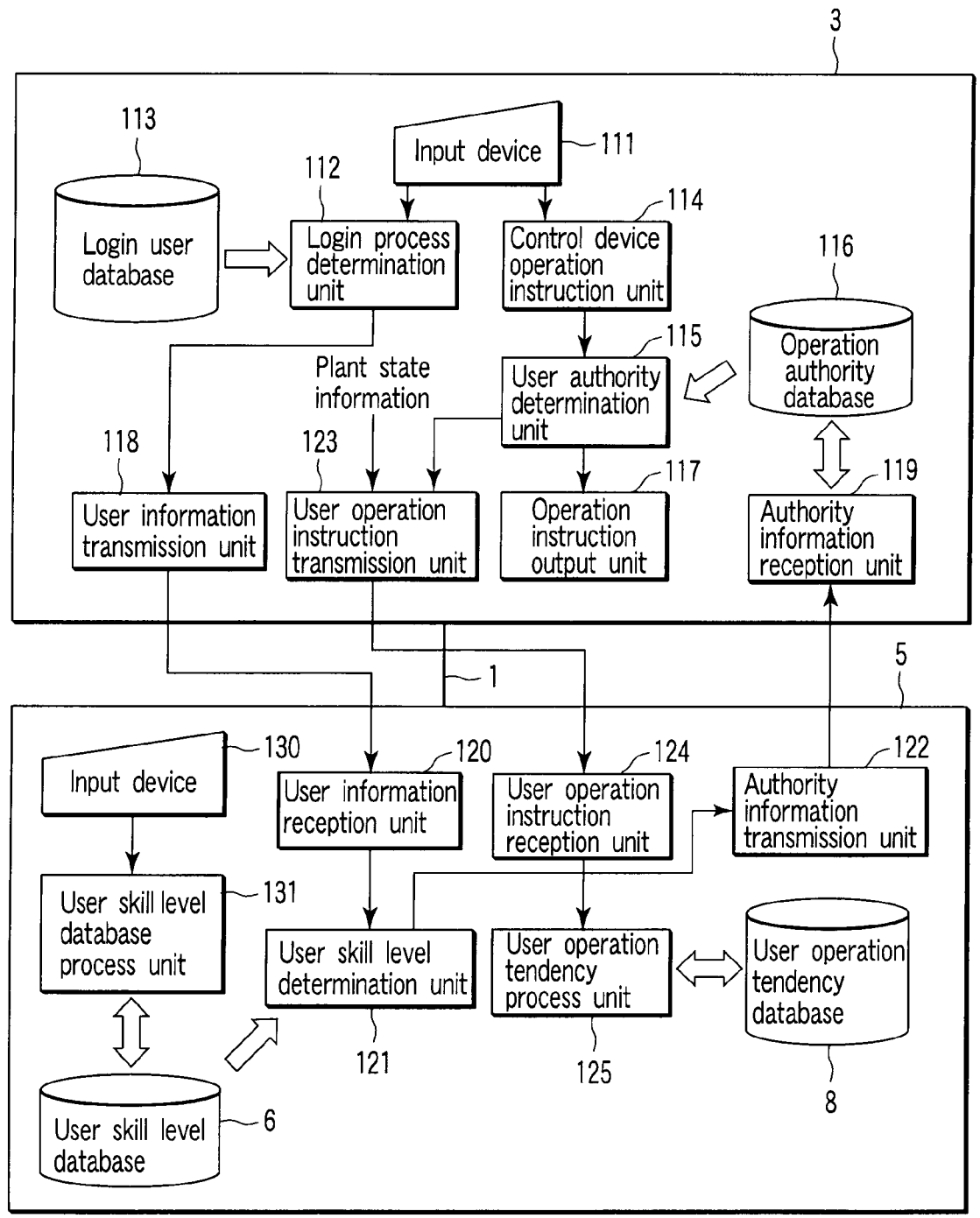
FIG. 8 is a detailed block diagram showing parts of the plant monitor-control apparatus according to the second embodiment of the present invention.

FIG. 8 is a detailed block diagram showing the structures of an operation/monitor device 3 and a user skill level management device 5 of the plant monitor-control apparatus according to the second embodiment of the present invention. The operation/monitor device 3 in the second embodiment of the invention is additionally provided with a user operation instruction transmission unit 123, compared to the operation/monitor device 3 in the first embodiment shown in FIG. 3. In addition, the user skill level management device 5 in the second embodiment of the present invention is additionally provided with a user operation tendency database 8, a user operation instruction reception unit 124 and a user operation tendency process unit 125, compared to the user skill level management device 5 in the first embodiment shown in FIG. 3.

An operation instruction, which is input by the user through the input device 111 in the operation/monitor device, 3 to 3n, is sent from the user operation instruction transmission unit 123 to the user skill level management device 5 via the network 1 together with the user information and plant state information which indicates the state of the plant at the time of the operation by the user, according to the user operation instruction transmission process 81a. In the user skill level management device 5 that has received the data, the user operation tendency process unit 125 registers in the user operation tendency database 8 the operation tendency of the user in the received plant state, according to the user operation tendency storing process 81b.

Specifically, it is confirmed whether the operation instruction in the received plant state is registered in the user operation tendency database 8. If the received operation instruction is already registered, the corresponding operation is weighted. If the received operation instruction is not registered in the user operation tendency database 8, the operation instruction is newly registered. Thereby, the operation tendency of the user in a certain state of the plant becomes clear.

FIG. 9 shows an example of the record content of the user operation tendency database 8.

As shown in the Figure, the user operation tendency database 8 stores a user name (user information), plant states of respective systems, a user operation instruction and data of a weight (frequency) corresponding to the user operation instruction. In the example of FIG. 9, the data of the plant states are stored in association with the respective systems, but the data may be stored batchwise.

For example, FIG. 10 shows a user operation tendency database in a case where in the state in which the data shown in FIG. 9 are stored, a user 1 executes an operation a1 in the plant state (system 1: A, system 2: C), and then executes an operation b1 in the plant state (system 1: A, system 2: D). Since the operation a1 is already present in the plant state (system 1: A, system 2: C), the associated weight is increased.

Since the operation b1 is not present in the plant state (system 1: A, system 2: D), the operation b1 is newly added.

In the Figure, in the case where the weight of the operation a1 is "1/50" in the plant state (system 1: A, system 2: C), this means that the number of operations executed in the plant state (system 1: A, system 2: C) is 50, and the number of times of the operation a1 that is executed is one. In the case where the weight of the operation a2 is "49/50" in the plant state (system 1: A, system 2: C), this means that the number of operations executed in the plant state (system 1: A, system 2: C) is 50, and the number of times of the operation a2 that is executed is 49.

In the description of this example, it is assumed that the weights of all operations are constant. However, it is possible to increase the weight of a lately executed operation. In addition to the operation, the screen, which is opened at the time of the operation, may be stored in order to confirm that the process value is checked. Thereby, the tendency becomes clearer.

The user skill level management device 5 and user operation tendency database 8 may be included in the operation/monitor device, 3 to 3m. Besides, only the user operation tendency database 8 may be configured as a separate system. Besides, the user operation tendency database 8 may be included in the user skill level database 6.

According to the second embodiment, with reference to the user operation tendency database, it can be checked what kind of operation has been executed by each user, and what kind of operation tends to be executed. Thereby, guidance and prevention of an erroneous operation can be realized.

Third Embodiment

Figure 11:
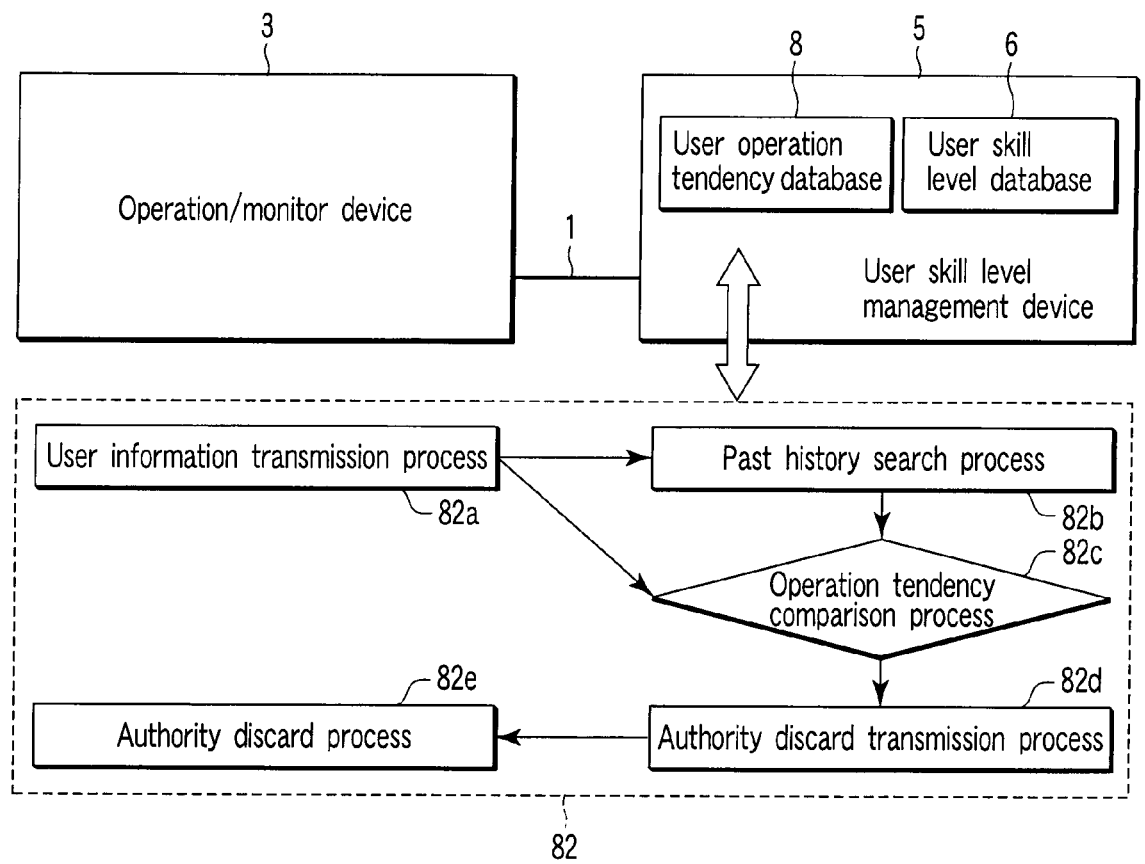
FIG. 11 shows the structure of a plant monitor-control apparatus according to a third embodiment of the present invention.

FIG. 11 shows the structure of a plant monitor-control apparatus according to a third embodiment of the present invention. In the third embodiment, the user skill level management device 5 stores the past operation history of each operator and compares the stored operation pattern with an actual operation pattern, thereby performing authentication. Specifically, the user skill level management device 5 executes a user operation authentication flow 82 for carrying out an authentication process of a user operation pattern.

In FIG. 11, the user skill level management device 5 executes the user operation authentication flow 82 on the basis of the user operation tendency database 8. Specifically, in the user skill level management device 5, a user information transmission process 82a, a past history search process 82b, an operation tendency comparison process 82c, an authority discard transmission process 82d and an authority discard process 82e are executed.

Figure 12:
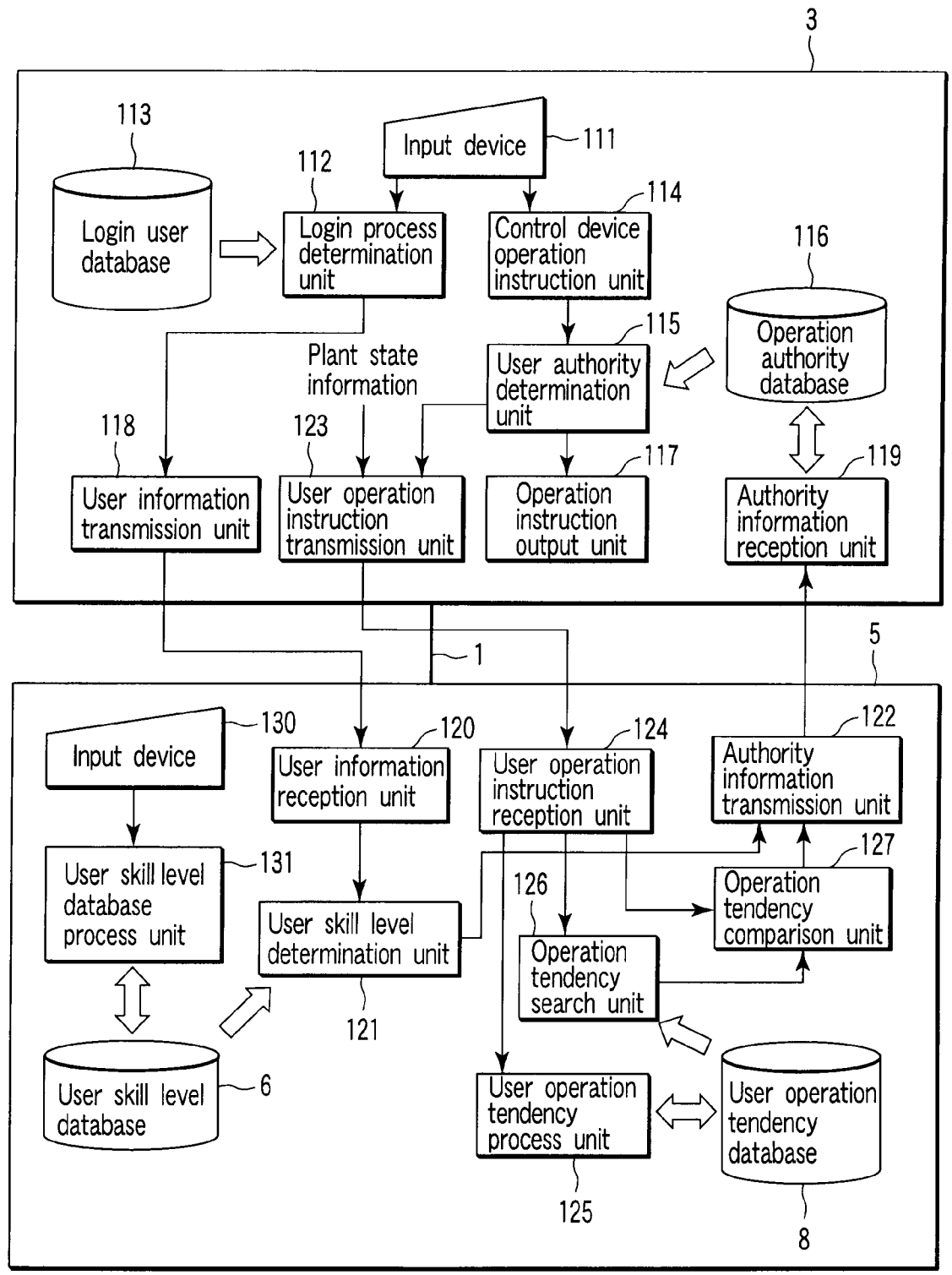
FIG. 12 is a detailed block diagram showing the structures of an operation/monitor device and a user skill level management device in the plant monitor-control apparatus according to the third embodiment of the present invention.

FIG. 12 is a detailed block diagram showing the structures of an operation/monitor device 3 and a user skill level management device 5 in the plant monitor-control apparatus according to the third embodiment of the present invention. The operation/monitor device 3 in the third embodiment of the invention is the same as the operation/monitor device 3 in the second embodiment shown in FIG. 8. The user skill level management device 5 in the third embodiment of the invention is additionally provided with an operation tendency search unit 126 and an operation tendency comparison unit 127, compared to the user skill level management device 5 in the second embodiment shown in FIG. 8.

An operation instruction, which is input by the user through the input device 111 in the operation/monitor device, 3 to 3n, is sent from the user operation instruction transmission unit 123 to the user skill level management device 5 via the network 1 together with the user information and plant state information, according to the user information transmission process 82a.

In the user skill level management device 5 that has received the operation instruction, the operation tendency search unit 126 refers to the user operation tendency database 8 that stores data associated with respective users, according to the past history search process 82b, and retrieves the past operation history of the user in the present plant state.

Subsequently, the operation tendency comparison unit 127 determines, according to the operation tendency comparison process 82c, whether the operation tendency is similar to the tendency of the operation history. If the operation tendency is greatly different, authority discard information, together with the user information, is transmitted according to the authority discard transmission process 82d. The authority discard information is sent to the operation/monitor device, 3 to 3n, via the network 1. In the operation/monitor device, 3 to 3n, the authority discard process 82e is executed on the basis of the transmitted authority discard information and authority discard information, and the operation authority database 116 is altered and the operation authority is discarded. The authority discard process refers to a process of discarding authority information corresponding to the received user information that is stored in the operation authority database in the operation/monitor device 3. Thereby, the user, whose authority information is discarded, is unable to execute an operation.

Specifically, a description is given of the case in which the user 1 executes an operation in the plant state (system 1: A, system 2: C) in the case where the operation history shown in FIG. 10 is stored. In the case where the user 1 executes the operation 1a, the weight is $2/51$. If this value is a certain threshold or less, the authority discard process is executed.

If this method is simply applied, there may be a case in which a new operation cannot be executed at all. However, this method may be combined with scores in an ideal operation database in a fourth embodiment of the invention and, for example, a new operation with a current average scope or more is permitted or (weight×score) is compared with a threshold. Thereby, a new operation/rare operation is enabled with respect to a more proper operation, and authority is discarded only when an improper operation is executed. Thus, the safely is more enhanced. In addition, the screen that is opened at the time of the operation may be added as an object.

The user skill level management device 5 and user operation tendency database 8 may be included in the operation/monitor device, 3 to 3m, or only the user operation tendency database 8 may be configured as a separate system. Besides, the user operation tendency database 8 may be included in the user skill level database 6.

According to the third embodiment, authentication can be executed according to individual operation patterns, and an erroneous operation by an illegal intruder, etc. can be prevented.

Fourth Embodiment

FIG. 13 shows the structure of a plant monitor-control apparatus according to a fourth embodiment of the present invention. In this fourth embodiment, the user skill level management device 5 is additionally provided with an ideal operation database 9, compared to the plant monitor-control apparatus according to the third embodiment shown in FIG. 11. By comparing an ideal operation pattern with an actual operation pattern, the increase/decrease of the user skill level is determined. The ideal operation database 9 stores, as ideal operation patterns, exemplary operation patterns which are considered to be ideal, in association with plant states.

The user skill level management device 5 executes a user operation technique determination flow 91. Specifically, a user information transmission process 91a, a plant state search process 91b, an operation tendency comparison process 91c and a user skill level operation process 91d are executed.

FIG. 14 is a detailed block diagram showing the structures of an operation/monitor device 3 and a user skill level management device 5 in the plant monitor-control apparatus according to the fourth embodiment of the present invention. The operation/monitor device 3 in the fourth embodiment of the invention is the same as the operation/monitor device 3 in the second embodiment shown in FIG. 12. The user skill level management device 5 in the fourth embodiment of the invention is additionally provided with an ideal operation database 9, an operation tendency comparison unit 127, an ideal operation search unit 128 and a user skill level operation unit 129, compared to the user skill level management device 5 in the third embodiment shown in FIG. 12.

An operation instruction, which is input by the user through the input device 111 in the operation/monitor device, 3 to 3n, is sent to the user skill level management device 5 via the network 1 together with the user information and plant state information, according to the user information transmission process 91a.

In the user skill level management device 5 that has received the operation instruction, the ideal operation search unit 128 searches the ideal operation database 9 for the ideal operation pattern in the received current plant state, according to the plant state search process 91b.

Subsequently, the operation tendency comparison unit 127 determines whether the operation tendency is similar to the ideal operation tendency, according to the operation tendency comparison process 91c. In the user skill level operation process 91d that is executed by the user skill level operation unit 129, if the result of the operation tendency comparison process 91c is "good", the user skill level in the user skill level database 6 is increased. If the result of the operation tendency comparison process 91c is "poor", the user skill level in the user skill level database 6 is decreased.

FIG. 15 shows the content of the ideal operation database.

As shown in the Figure, the ideal operation database stores plant states of respective systems, operation instructions, importance degrees, and next plant states of respective systems in an associated manner. Specifically, the importance degree of the operation in each of the plant states is included.

Basically, the importance degree is indicated with respect to all possible operations in the states of the respective systems of the plant. In FIG. 15, for the purpose of description, "next states" are indicated. Actually, the next state is uniquely determined by "plant state+operation". Thus, the next plant state is not necessarily stored in the ideal operation database.

Figures 17, 18:
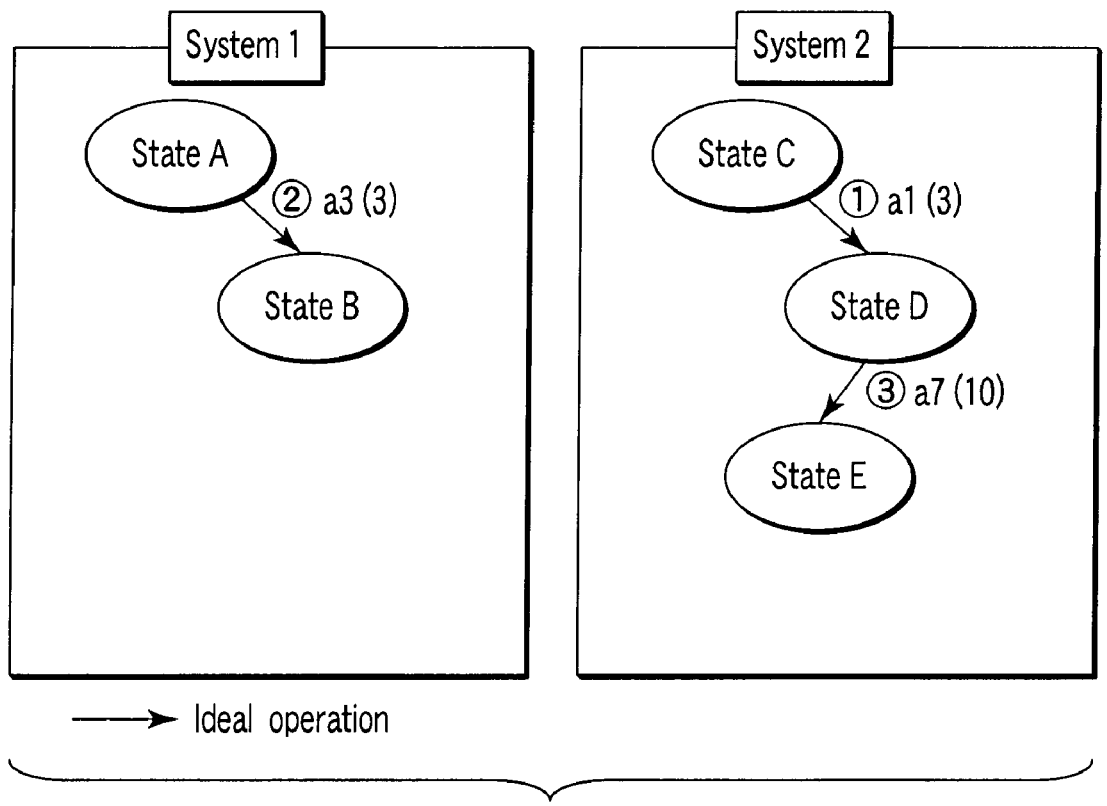
FIG. 17 is a state transition diagram showing the transition of the state of the plant in each system.
FIG. 18 shows the relationship between plant states and operation instructions that are input.

A description is given of the case in which state transition is executed by the operation from a stable state 1 (system 1: A, system 2: C) to a stable state 2 (system 1: B, system 2: E) in FIG. 15. In the ideal operation from the stable state 1 to stable state 2, a highest score is obtained among attainable paths, and thus the transition as shown in FIG. 16 and FIG. 17 is executed. FIG. 16 shows the relationship between plant states and input operation instructions, and FIG. 17 shows state transitions of plant states of respective systems.

For the purpose of reference, importance degrees of operations in the ideal operation database are indicated on the side of the operations. At this time, the sum (score) of the importance degrees is 3+3+10=16. If the user A transitions the stable state 1 to stable state 2 by the operation shown in FIG. 18 and FIG. 19, the sum (score) of the importance degrees is 11.

Figures 19, 20:
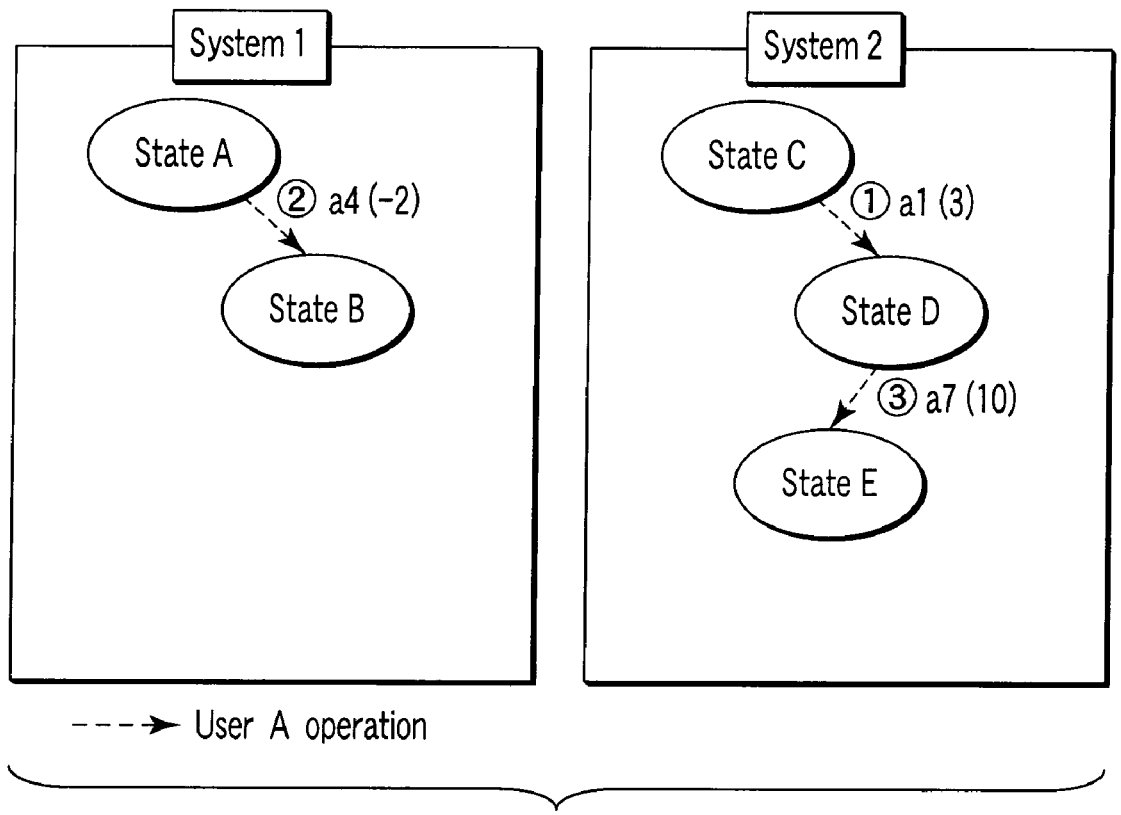
FIG. 19 is a state transition diagram showing the transition of the state of the plant in each system.
FIG. 20 shows the relationship between plant states and operation instructions that are input.
Figure 21:
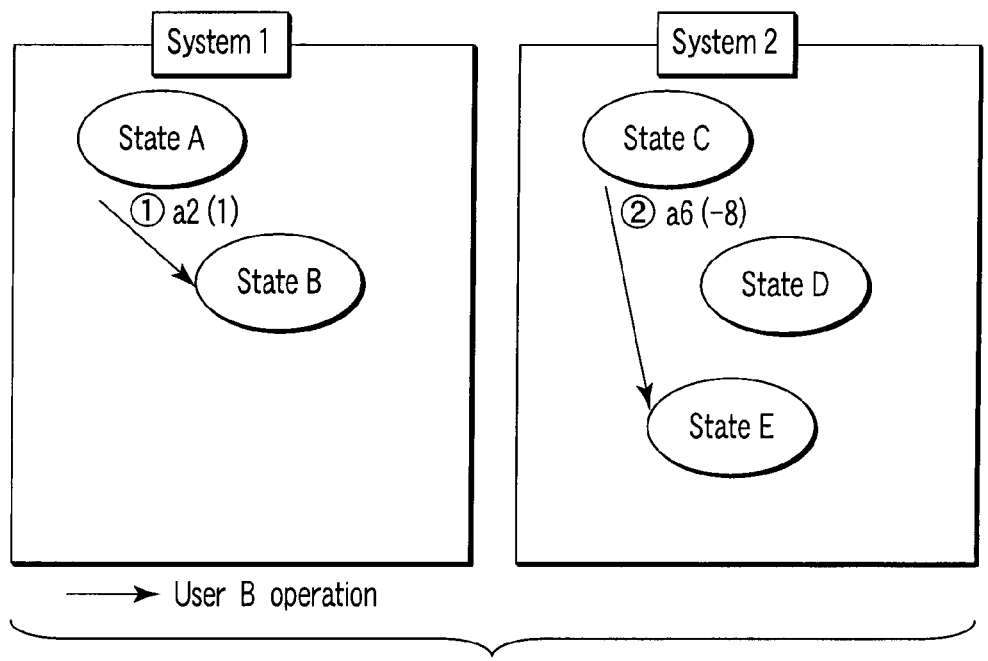
FIG. 21 is a state transition diagram showing the transition of the state of the plant in each system.

In addition, if the user B transitions the stable state 1 to stable state 2 by the operation shown in FIG. 20 and FIG. 21, the sum (score) of the importance degrees is −7. By using this value, the skill level of the user is increased/decreased. Although not described, the screen that is opened at the time of the operation may be included as an object.

Specifically, the following process is thinkable. In accordance with the added point of the calculated importance degree, the user skill level stored in the user skill level database 6 is rewritten. For example, if the added point of the calculated importance degree exceeds 10, the user skill level is increased by one. If the added point of the importance degree is less than −10, the user skill level is decreased by one. However, the process is not limited to this.

The user skill level management device 5 and ideal operation database 9 may be included in the operation/monitor device, 3 to 3*m*. Besides, only the ideal operation database 9 may be configured as a separate system.

According to the fourth embodiment, the present user skill level can be confirmed, and guidance and prevention of an erroneous operation can be realized. Moreover, an improvement in skill level by the principle of competition can be expected.

Fifth Embodiment

Figure 22:
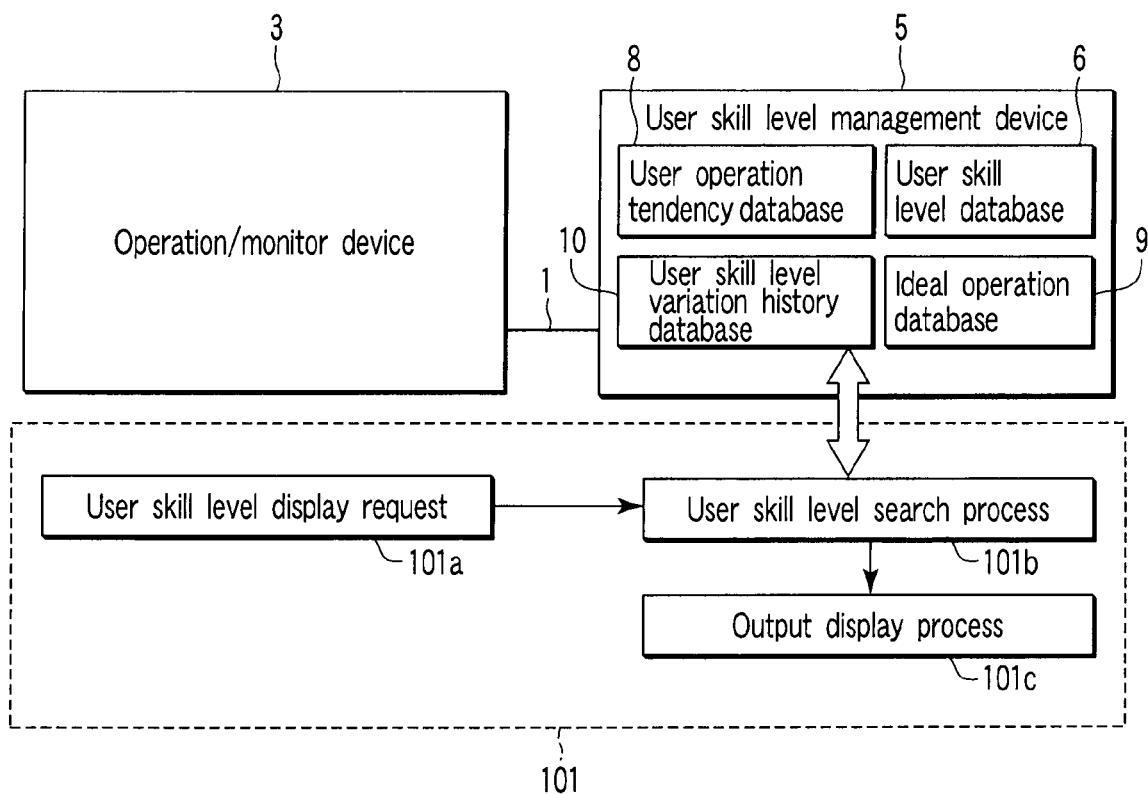
FIG. 22 shows the structure of a plant monitor-control apparatus according to a fifth embodiment of the present invention.

FIG. 22 shows the structure of a plant monitor-control apparatus according to a fifth embodiment of the present invention. In the fifth embodiment, compared to the fourth embodiment shown in FIG. 13, the user skill level management device 5 is additionally provided with a user skill level variation history database 10, and a user skill level in a predetermined time period is displayed. The user skill level variation history database 10 stores user information and a history of the user skill level in an associated manner. The user skill level management device 5 executes a user skill level display process flow 101. Specifically, the user skill level management device 5 executes a user skill level display request 101*a*, a user skill level search process 101*b* and an output display process 101*c*.

FIG. 23 is a detailed block diagram showing the structures of an operation/monitor device 3 and a user skill level management device 5 in the plant monitor-control apparatus according to the fifth embodiment of the present invention. The operation/monitor device 3 in the fifth embodiment of the invention comprises an input device 111, a display request instruction unit 132, a user authority determination unit 115, a display request transmission unit 133 and an operation authority database 116. The user skill level management device 5 in the fifth embodiment of the invention comprises a user skill level variation history database 10, a display request reception unit 134, a user skill level search unit 135, an output process unit 136 and an output device 137.

In the operation/monitor device, 3 to 3*n*, or the user skill level management device 5, if a user skill level display request 101*a* is executed by using the input device 111, the display request instruction unit 132 recognizes the display request, and the user authority determination unit 115 refers to the operation authority database 116 and confirms the presence/absence of the operation authority. If the user has the operation authority, display request data including user information of the user, who executes the display request of user skill level, is sent from the display request transmission unit 133 to the user skill level management device 5 via the network 1.

Figure 24:
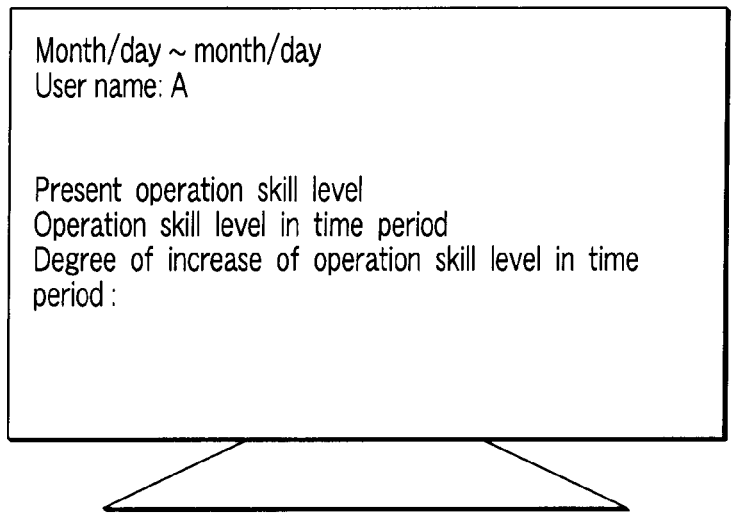
FIG. 24 is a plan view showing an example of a display screen in the plant monitor-control apparatus according to the fifth embodiment of the present invention.

By the display request reception unit 134, the user skill level management device 5 receives the display request data. The user skill level search unit 135 executes the user skill level search process 101*b*. The user skill level search unit 135 refers to the user skill level variation history database 10 on the basis of the user information included in the received display request data, and acquires the skill level of the user corresponding to the received user information. Based on the history of the acquired user skill level, the user skill level in a predetermined time period and the variation ratio of the user skill level are determined. Thereafter, the output process unit 136 executes the output display process 101*c*, and the user skill level in the predetermined time period and the variation ratio of the user skill level are displayed on the output device 137, as shown in FIG. 24.

The user skill level management device 5 and user skill level variation history database 10 may be included in the operation/monitor device, 3 to 3*m*, or only the user skill level variation history database 10 may be configured as a separate system. Besides, the user skill level variation history database 10 may be included in the user skill level database 6.

According to the fifth embodiment, for example, the operation skill level of today may be displayed on the operation/monitor device before the user goes home, and the user skill level in a predetermined time period can be confirmed. Therefore, guidance and prevention of an erroneous operation can be realized. Moreover, an improvement in skill level by the principle of competition can be expected.

Sixth Embodiment

Figure 25:
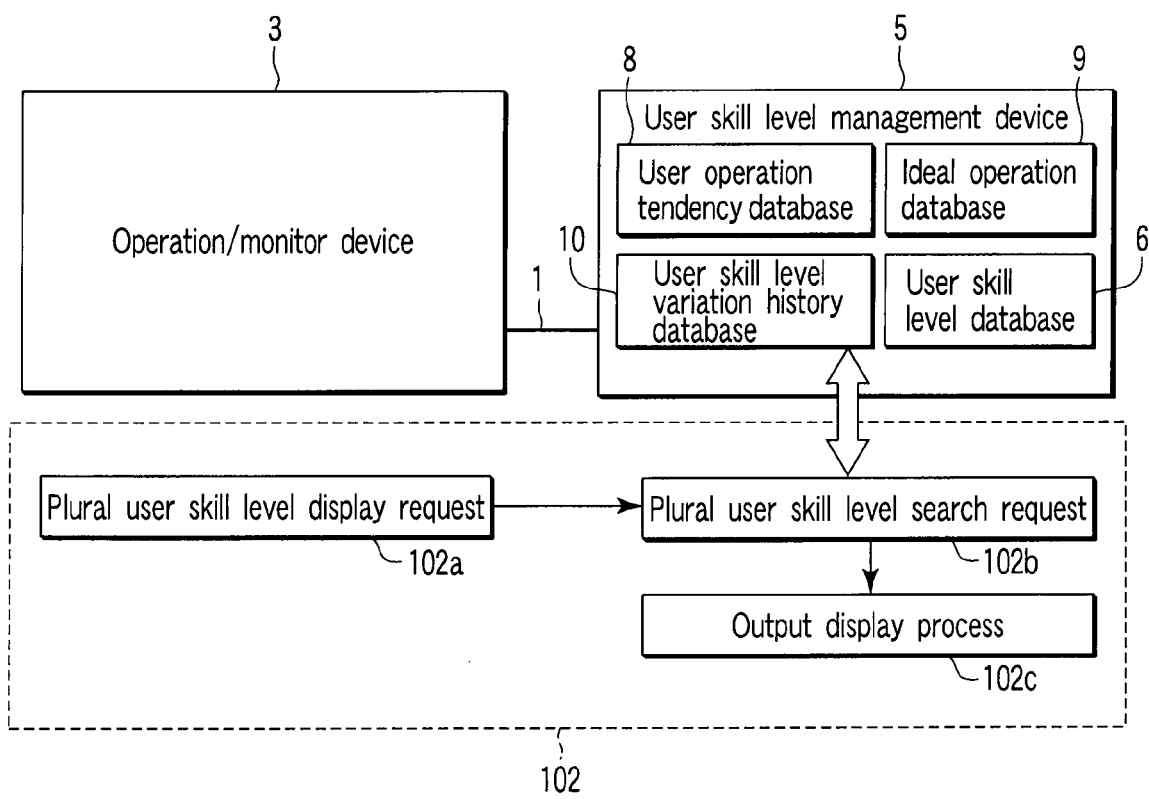
FIG. 25 shows the structure of a plant monitor-control apparatus according to a sixth embodiment of the present invention.

FIG. 25 shows the structure of a plant monitor-control apparatus according to a sixth embodiment of the present invention. In the sixth embodiment, compared to the fifth embodiment shown in FIG. 22, the user skill level management device 5 is configured to compare and display the operation skill levels of a plurality of users in a certain state of the plant.

The user skill level management device 5 executes a plural user skill level display process flow 102. Specifically, the user skill level management device 5 executes a plural user skill level display request 102*a*, a plurality user skill level search process 102*b* and an output display process 102*c*.

Figure 26:
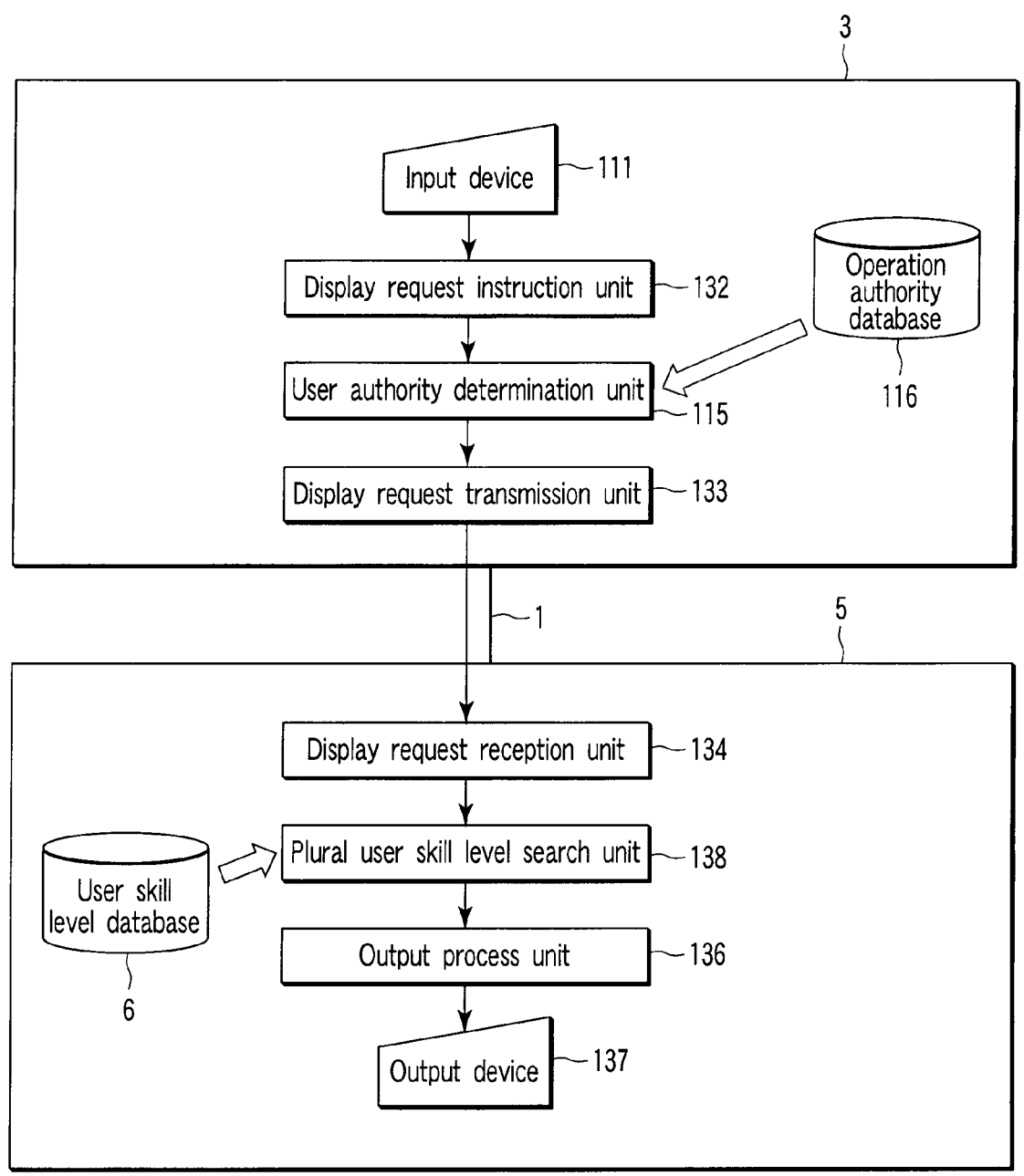
FIG. 26 is a detailed block diagram showing the structures of an operation/monitor device and a user skill level management device in the plant monitor-control apparatus according to the sixth embodiment of the present invention.

FIG. 26 is a detailed block diagram showing the structures of an operation/monitor device 3 and a user skill level management device 5 in the plant monitor-control apparatus according to the sixth embodiment of the present invention. The operation/monitor device 3 in the sixth embodiment of the invention is the same as the operation/monitor device 3 in the fifth embodiment shown in FIG. 23. In the user skill level management device 5 in the sixth embodiment of the invention, compared to the user skill level management device 5 in the fifth embodiment shown in FIG. 23, the user skill level variation history database 10 is replaced with a user skill level database 6, and the user skill level search unit 135 is replaced with a plural user skill level search unit 138.

Figure 27:
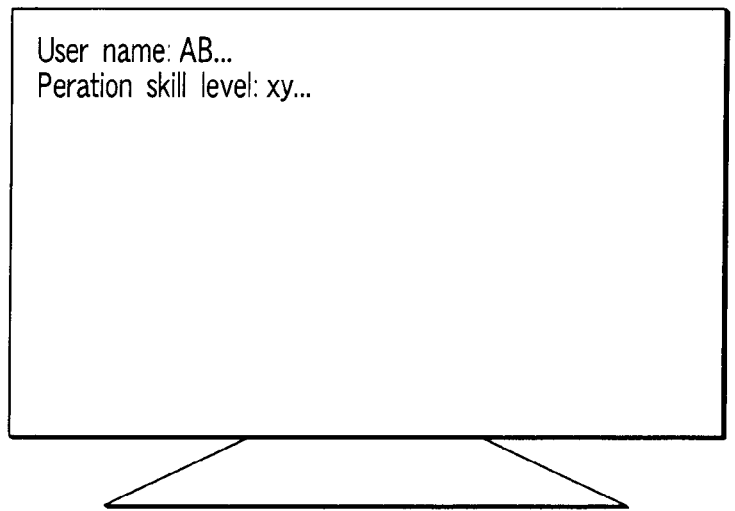
FIG. 27 is a plan view showing an example of a display screen in the plant monitor-control apparatus according to the sixth embodiment of the present invention.

The user skill level management device 5 receives the plural user skill level display request 102*a* including plural user information, which is transmitted from the operation/monitor device, 3 to 3*n*, or receives input of the plural user skill level display request from an input device (not shown) of the user skill level management device 5. In the user skill level management device 5, the plural user skill level search unit 138 executes the plurality user skill level search process 102*b*. The plural user skill level search unit 138 refers to the user skill level database 6, and acquires the present skill levels of a plurality of users corresponding to the plural user information included in the received plural user skill level display request. Thereafter, the output process unit 136 executes the output display process 102*c*, and the acquired present skill levels of the plural users are displayed on the output device 137, as shown in FIG. 27.

The user skill level management device 5 and user skill level database 6 may be included in the operation/monitor device, 3 to 3*m*, or only the user skill level database 6 may be configured as a separate system.

According to the sixth embodiment, the individual user skill levels, as a whole, can be confirmed, and guidance and prevention of an erroneous operation can be realized. Moreover, an improvement in skill level by the principle of competition can be expected.

Seventh Embodiment

Figure 28:
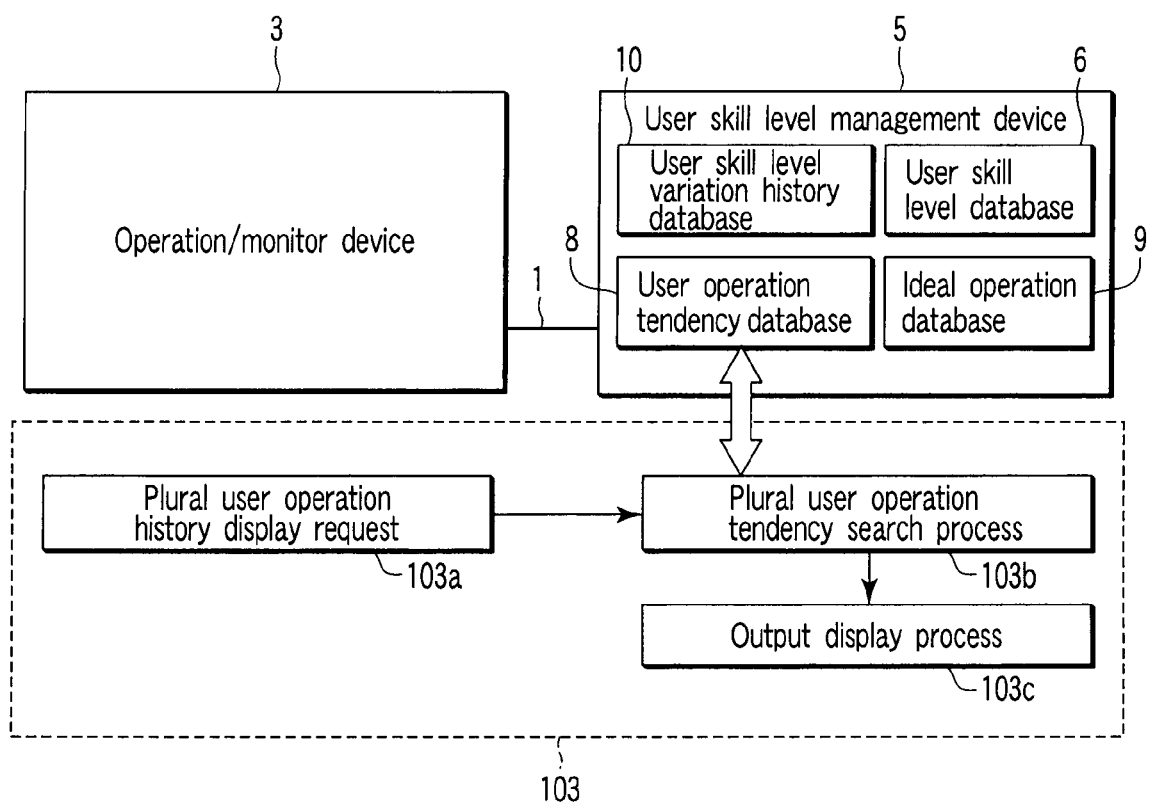
FIG. 28 shows the structure of a plant monitor-control apparatus according to a seventh embodiment of the present invention.

FIG. 28 shows the structure of a plant monitor-control apparatus according to a seventh embodiment of the present invention. In the seventh embodiment, compared to the sixth embodiment shown in FIG. 25, the user skill level management device 5 is configured to compare and display operation histories of plural users in a certain state of the plant, instead of operation skill levels of plural users in a certain state of the plant.

The user skill level management device 5 executes the process of a plural user operation tendency display process flow 103. Specifically, the user skill level management device 5 executes a plural user operation history display request 103*a*, a plural user operation history search process 103*b* and an output display process 103*c*.

Figure 29:
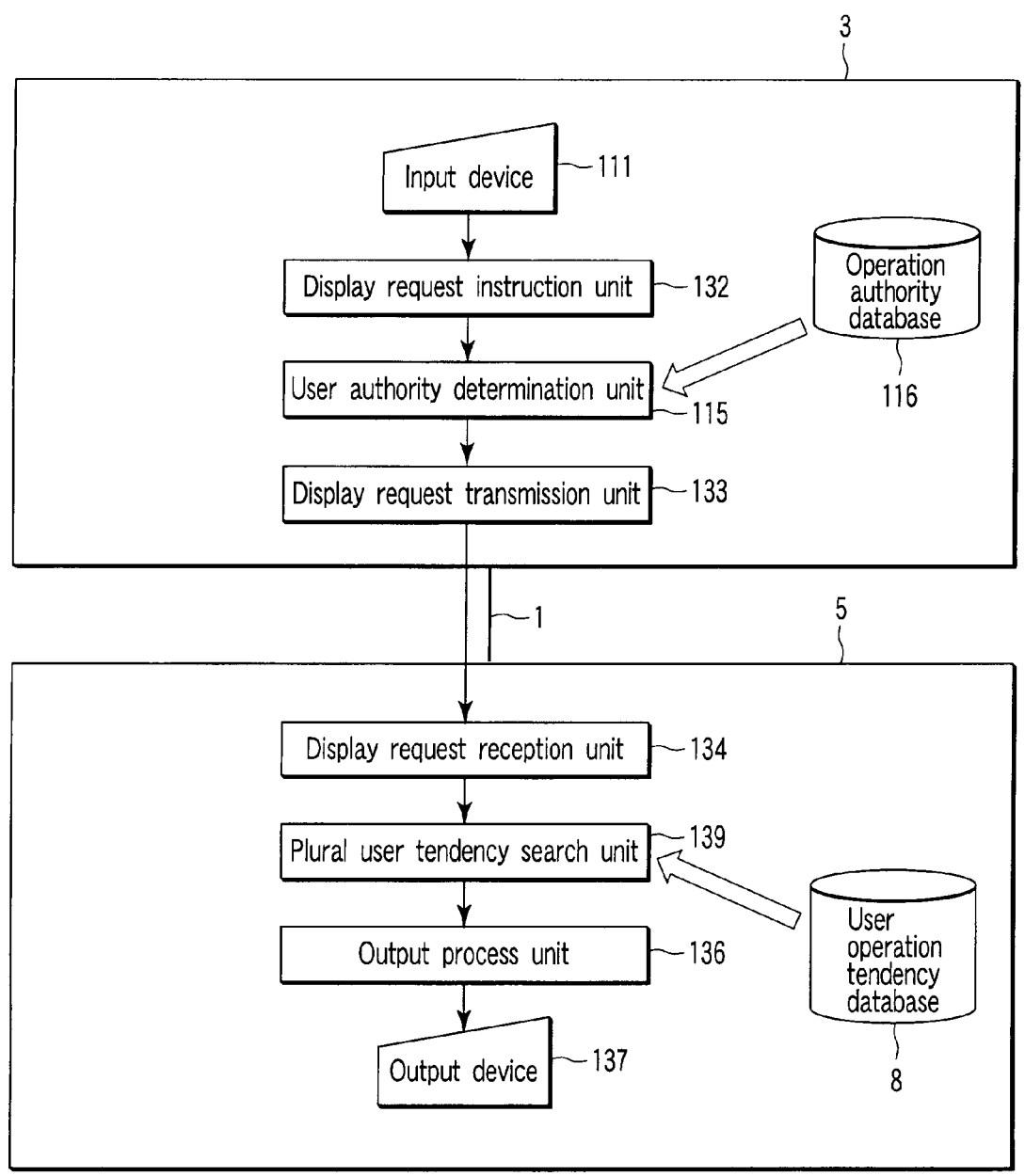
FIG. 29 is a detailed block diagram showing the structures of an operation/monitor device and a user skill level management device in the plant monitor-control apparatus according to the seventh embodiment of the present invention.

FIG. 29 is a detailed block diagram showing the structures of an operation/monitor device 3 and a user skill level management device 5 in the plant monitor-control apparatus according to the seventh embodiment of the present invention. The operation/monitor device 3 in the seventh embodiment of the invention is the same as the operation/monitor device 3 in the sixth embodiment shown in FIG. 26. In the user skill level management device 5 in the seventh embodiment of the invention, compared to the user skill level management device 5 in the sixth embodiment shown in FIG. 26, the user skill level database 6 is replaced with a user operation tendency database 8, and the plural user skill level search unit 138 is replaced with a plural user tendency search unit 139.

The user skill level management device 5 receives, from the operation/monitor device, 3 to 3*n*, plural user information and the plural user operation tendency display request 103*a* including the plant state, the display of which is desired, or receives the plural user operation tendency display request from an input device (not shown) of the user skill level management device 5.

Figure 30:
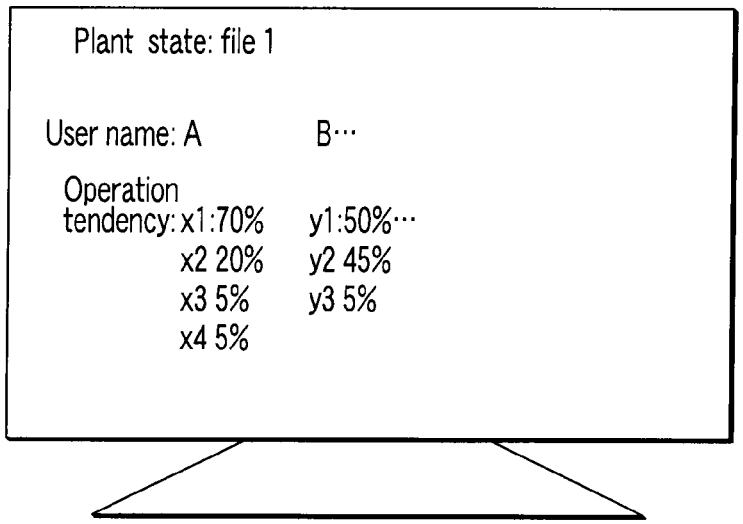
FIG. 30 is a plan view showing an example of a display screen in the plant monitor-control apparatus according to the seventh embodiment of the present invention.

In the user skill level management device 5, the plural user tendency search unit 139 executes the plural user operation tendency search process 103*b*, refers to the user operation tendency database 8, and acquires the frequency of the operation instruction corresponding to the plural user information in the plant state, which is included in the received plural user operation tendency display request 103*a*. In the output display process 103*c*, the frequency of the operation instruction of plural users in the plant state, which is designated by the user operation tendency display request 103*a*, is displayed, as shown in FIG. 30, on the output device 137 in connection with each of the users.

The desired plant state, which is transmitted from the operation/monitor device, 3 to 3*n*, to the user skill level management device 5, can easily be set by the operation/monitor device, 3 to 3*n*. The present plant state may be stored in the operation/monitor device, 3 to 3*n*, and the stored data may be used. Besides, typical plant states may be prepared in advance.

The user skill level management device 5 and user operation tendency database 8 may be included in the operation/monitor device, 3 to 3*m*, or only the user operation tendency database 8 may be configured as a separate system. Besides, the user operation tendency database 8 may be included in the user skill level database 6.

According to the seventh embodiment, the individual user operation tendencies in a certain state of the plant can be confirmed, and guidance and prevention of an erroneous operation can be realized. Moreover, an improvement in skill level by the principle of competition can be expected.

Eighth Embodiment

Figure 31:
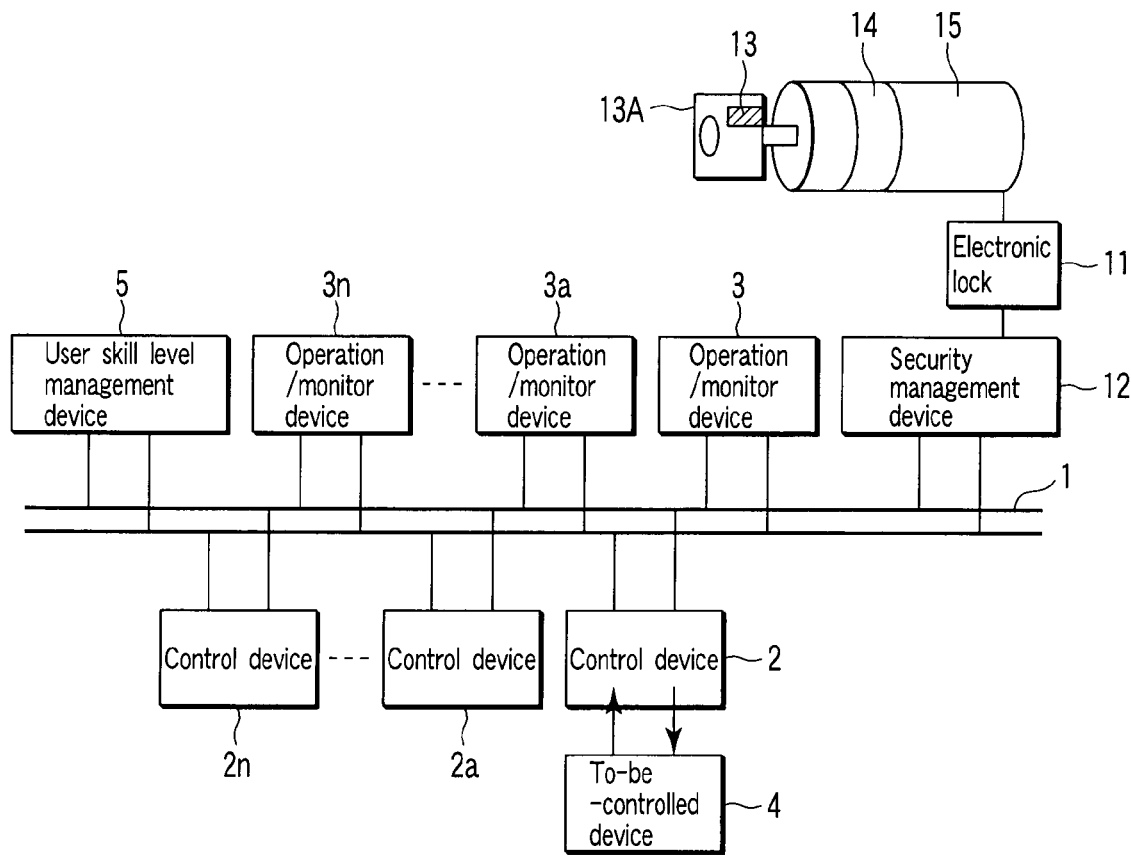
FIG. 31 shows the structure of a plant monitor-control apparatus according to an eighth embodiment of the present invention.

FIG. 31 shows the structure of a plant monitor-control apparatus according to an eighth embodiment of the present invention. Compared to the first embodiment shown in FIG. 1, the eighth embodiment includes a security management device 12 which executes authentication of an operator when a key 13A is inserted in a key cylinder 15 of an electronic lock device 11.

In FIG. 31, the key 13A includes a small-sized communication chip (electronic circuit) 13. When the key 13A is inserted in the key cylinder 15, the electronic lock device 11 reads identification information of the small-sized communication chip 13 of the key 13A by means of an antenna coil 14, and transmits the identification information to the security management device 12.

Figure 32:
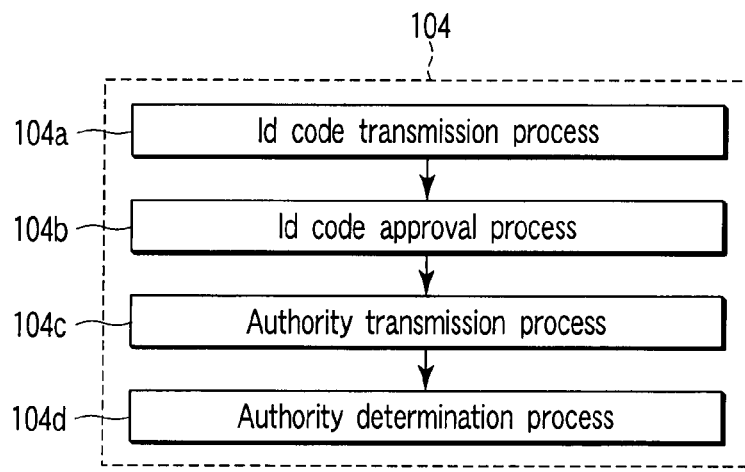
FIG. 32 is a flow chart illustrating the operation of an electronic lock device and a security management device in the eighth embodiment of the present invention.

FIG. 32 is a flow chart illustrating the operation of the electronic lock device 11 and security management device 12 in the eighth embodiment of the present invention. The electronic lock device 11 and security management device 12 in the eighth embodiment of the present invention execute a process according to a security management flow 104. Specifically, an ID code transmission process 104*a*, an ID code approval process 104*b*, an authority transmission process 104*c* and an authority determination process 104*d* are executed.

The electronic lock device 11 has an ID code (identification information) of the key 13A, and is configured such that the function thereof is not easily disabled and the operation thereof is not released. Moreover, the electronic lock device 11 is not easily disassembled or destroyed.

When the key 13A is inserted in the key cylinder 15 that is connected to the electronic lock device 11, the ID code (identification information), which is pre-recorded in the small-sized communication chip 13 that is buried in the grip of the key 13A, is transmitted to and is read by the antenna coil 14 that is wound around the key cylinder 15.

The data that is read by the antenna coil 14 is transmitted to the security management device 12 by the ID code transmission process 104*a*. The read data is subjected to the ID code approval process 104*b* with reference to an ID code database that is prestored in the security management device 12, and the user is determined. In the database, ID codes are associated with authority information that indicates the range of executable operations of the to-be-controlled device.

If the ID code stored in the database agrees with the read ID code in the ID code approval process 104*b*, the authority information that is associated with the ID code is sent to the operation/monitor device, 3 to 3n, via the network 1 by the authority transmission process 104c.

The operation/monitor device, 3 to 3n, executes the authority determination process 104d on the basis of the received authority information, and user login is executed. The operation/monitor device determines whether the input operation instruction meets the authority information that is output from the security management device, and outputs only the operation instruction, which meets the authority information, to the control device.

The electronic lock device 11 and security management device 12 may be included in the operation/monitor device, 3 to 3n. In addition, the security management device 12 may be equipped with a function of granting an operation authority corresponding to the user skill level in the user skill level management device 5.

According to the eighth embodiment, authority can be granted by the key, and it is possible to prevent an operation by an illegal intruder and to prevent an erroneous operation and a serious accident.

Ninth Embodiment

Figure 33:
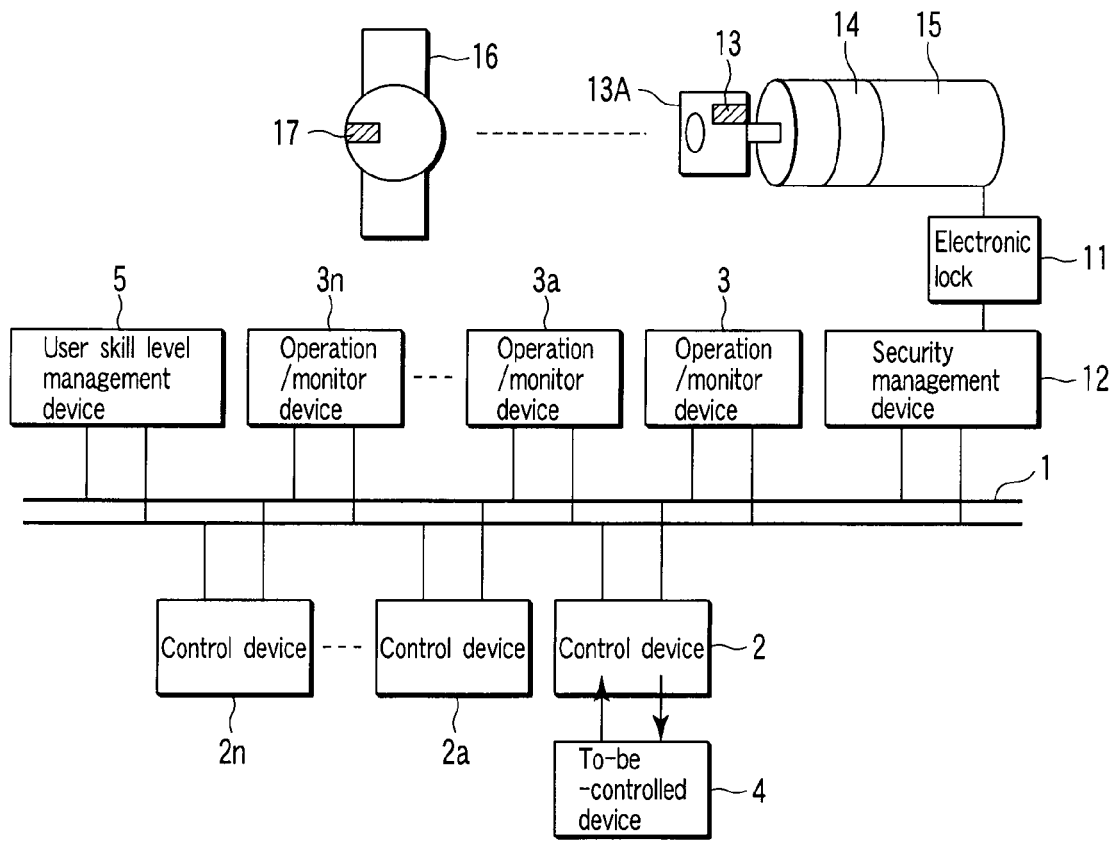
FIG. 33 shows the structure of a plant monitor-control apparatus according to a ninth embodiment of the present invention.

FIG. 33 shows the structure of a plant monitor-control apparatus according to a ninth embodiment of the present invention. In the ninth embodiment, compared to the eighth embodiment shown in FIG. 31, the security management device 12 determines the operator by executing authentication with a mobile device 16, in addition to the insertion of the authentic key into the electronic lock device.

In FIG. 33, the mobile device 16 is a mobile device such as a wristwatch. A small-sized electronic chip (electronic circuit) 17 is buried in the mobile device 16. Communication is executed between the small-sized electronic chip 17 buried in the mobile device 16 and the small-sized electronic chip (electronic circuit) 13 buried in the key 13A that is inserted in the electronic lock device 11. If the small-sized electronic chip 13 buried in the key 13A determines that the ID code (identification information) of the small-sized electronic chip 17 agrees with the ID code (identification information) of the small-sized electronic chip 13 of the key 13A, the ID code that is pre-recorded in the small-sized communication chip 13 buried in the grip of the key 13A is transmitted to and read by the antenna coil 14 that is wound around the key cylinder 15. In the meantime, the process of determining agreement of IC codes is periodically executed, and if the ID codes do not agree, the ID code is not transmitted to the security management device 12.

The data that is read by the antenna coil 14 is transmitted to the security management device 12 by the ID code transmission process 104a. The read data is subjected to the ID code approval process 104b with reference to an ID code database that is pre-recorded in the security management device 12. Thereby, the user is determined. In the database, ID codes are associated with authority information that indicates the range of executable operations of the to-be-controlled device.

If the ID code stored in the database agrees with the read ID code in the ID code approval process 104b, the authority information that is associated with the ID code and the ID code, the agreement of which has been determined, are sent to the operation/monitor device, 3 to 3n, via the network 1 by the authority transmission process 104c.

The operation/monitor device, 3 to 3n, executes the authority determination process 104d on the basis of the received authority information and ID code, and user login is executed. The operation/monitor device determines, with respect to each ID, whether the input operation instruction meets the authority information that is output from the security management device, and outputs only the operation instruction, which meets the authority information, to the control device.

According to the ninth embodiment, authority can be granted by the dual security using the key 13A and the mobile device, and it is possible to prevent an operation by an illegal intruder and to prevent an erroneous operation and a serious accident.

Tenth Embodiment

FIG. 34 shows the structure of a plant monitor-control apparatus according to a tenth embodiment of the present invention. In the tenth embodiment, compared to the ninth embodiment shown in FIG. 33, an authority discard process 12A, which is executed when the removal of the key from the security management device 12 is forgotten, is added, and an erroneous operation is prevented by the mobile device 16 even if the removal of the authentic key is forgotten.

FIG. 35 is a flow chart illustrating the operation of the security management device 12 in the tenth embodiment of the present invention. The security management device 12 in the tenth embodiment executes a process according to a security authority discard flow 105. Specifically, a non-connected ID code transmission unit 105a, a non-connected ID code approval process 105b, an authority discard transmission process 105c and an authority discard process 105d are executed.

If the user moves away while the key 13A remains inserted in the electronic lock device 11, the communication, which is periodically executed between the small-sized electronic chip 17 buried in the mobile device 16 and the small-sized electronic chip 13 buried in the key 13A, is interrupted, and the ID code is not transmitted from the small-sized electronic chip 13.

The security management device 12 determines the ID code, the periodic transmission of which is stopped. Specifically, the non-connected ID code approval process 105a determines whether the ID code, the periodic transmission of which is stopped, agrees with the ID code that is pre-recorded in the database of the security management device 12.

If the ID codes agree, authority discard information, together with the agreeing ID code, is sent to the operation/monitor device, 3 to 3n, via the network 1, by the authority discard transmission process 105c relating to the user.

Upon receiving the authority discard information and ID code from the security management device 12, the operation/monitor device, 3 to 3n, executes the authority discard transmission process 105c for discarding the authority information of the associated ID code. Thus, the authority of an individual user, the use by whom is prohibited, is determined.

Specifically, when the operation/monitor device receives the ID code and the authority discard information, the operation/monitor device discards the authority information, which is associated with the ID code, from the database.

According to the tenth embodiment, when the removal of the key is forgotten, the authority of the associated user is lost. Thereby, while the user is away from the desk, an operation by another operator can be prevented, and it is possible to prevent an erroneous operation and a serious accident.

Eleventh Embodiment

FIG. 36 shows the structure of a plant monitor-control apparatus according to an eleventh embodiment of the present invention. In the eleventh embodiment, compared to the ninth embodiment shown in FIG. 33, a biometric authentication sensor 18 for sensing identification information of the operator is provided. The security management device 12 determines the operator on the basis of the identification information sensed by the biometric authentication sensor 18. The biometric authentication sensor 18 executes, for example, fingerprint authentication.

The biometric information, which is read by the biometric authentication sensor 18, is converted to an ID code of biometric information, which is pre-registered in the security management device 12. Subsequently, the user is determined by executing an ID code approval process which determines whether the converted ID code agrees with the database of the ID code, which is pre-recorded in the security management device 12.

In the case where the ID code that is converted in the ID code approval process agrees with the ID code that is recorded in the database, a transmission process is executed for transmitting the authority information of the user associated with the ID code, the agreement of which is determined, and the ID code, the agreement of which is determined. The authority information is sent to the operation/monitor device, 3 to 3n, via the network 1.

The operation/monitor device, 3 to 3n, executes the authority determination process 104d on the basis of the received authority information, and user login is executed. The operation/monitor device determines, with respect to each ID, whether the input operation instruction meets the authority information that is output from the security management device, and outputs only the operation instruction, which meets the authority information, to the control device.

According to the eleventh embodiment, the operation authority can be granted on the basis of biometric information. It is possible to prevent an operation by an illegal intruder and to prevent an erroneous operation and a serious accident.

Twelfth Embodiment

FIG. 37 shows the structure of a plant monitor-control apparatus according to a twelfth embodiment of the present invention. In the twelfth embodiment, compared to the first embodiment shown in FIG. 1, there is provided an operation authority opening device 19 which permits, without condition, all operators to perform a predetermined operation, e.g. a safe operation, at a time of emergency in the plant.

FIG. 38 is a flow chart illustrating the operation of the operation authority opening device 19 in the twelfth embodiment of the present invention. The operation authority opening device 19 executes a process of an emergency-time operation authority opening process flow 106. Specifically, an emergency information transmission process 106a, an operation authority transmission process 106b and an authority determination process 106c are executed.

If a plant emergency state is detected by the operation/monitor device, 3 to 3n, emergency state information is transmitted to the operation authority opening device 19 via the network 1 by the emergency information transmission process 106a.

The operation authority opening device 19, which has received the emergency state information, executes the operation authority transmission process 106b. Authority information, which permits only a predetermined safe operation, is sent to all the operation/monitor devices 3 to 3n via the network 1.

The operation/monitor devices 3 to 3n execute the authority determination process 106c on the basis of the received authority information which permits only the predetermined safe operation. All operators are permitted, without condition, to perform only the safe operation. The operation authority opening device 19 may be included in the user skill level management device 5 or in the security management device 12.

Specifically, when the operation/monitor device, 3 to 3n, receives the authority information that permits only a predetermined safe operation, the operation/monitor device, 3 to 3n, rewrites the operation authority information, which is stored in the operation authority database, to the received authority information that permits only the predetermined safe operation. Thereby, all users are permitted to perform the predetermined safe operation.

According to the twelfth embodiment, at a time of emergency of the plant, all operators are permitted to perform the safe operation. Thus, quick measures to the emergency can be taken, and serious accidents can be reduced.

The present invention is not limited directly to the above-described embodiments. In practice, the structural elements can be modified and embodied without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

According to the present invention, each user skill level is managed by a user skill level management device, and the operation authority corresponding to the user skill level is determined. Therefore, an erroneous operation or a serious accident due to an operation by a person with insufficient knowledge or by an illegal intruder can be prevented.

What is claimed is:
1. A plant monitor-control apparatus comprising:
   a control device which controls a to-be-controlled device of a plant;
   an operation/monitor device which outputs an operation instruction of the to-be-controlled device to the control device; and
   a user skill level management device which outputs, to the operation/monitor device, authority information which defines a range of operations of the plant corresponding to a user skill level of a user of the operation/monitor device,
   wherein the operation/monitor device includes means for outputting login user information, which indicates the user who completes login, to the user skill level management device,
   the user skill level management device includes:
   a user skill level database which stores, in an associated manner, user information, skill level information indicative of a skill level of an operation by the user, and the authority information corresponding to the skill level information; and
   authority information transmission means for searching the user skill level database by using the login user information, acquiring the authority information corresponding to the login user information, and transmitting the acquired authority information, together with the login user information, to the operation/monitor device, and
   the operation/monitor device further includes:
   an operation authority database which stores the user information and the authority information in an associated manner;
   means for searching the operation authority database by using the login user information, and acquiring opera- tion authority information corresponding to the login user information of the user who inputs the operation instruction; and means for determining whether the input operation instruction meets the range of operations of the plant, which is defined by the operation authority information that is acquired from the operation authority database, and outputting the operation instruction to the control device in a case where it is determined that the input operation instruction meets the range of operations of the plant.

2. The plant monitor-control apparatus according to claim 1, wherein the operation/monitor device further includes user operation instruction transmission means for transmitting to the user skill level management device the input operation instruction, the login user information and plant state information indicative of a state of the plant at a time when the user executes an operation, and the user skill level management device further includes:
a user operation tendency database which stores the user information, a plant state, the operation instruction and a frequency of the operation instruction in an associated manner; and
user operation tendency process means for updating the frequency stored in the user operation tendency database, on the basis of the operation instruction, the login user information and the plant state information, which are transmitted by the user operation instruction transmission means.

3. The plant monitor-control apparatus according to claim 2, wherein the user skill level management device further includes:
operation tendency search means for acquiring, from the user operation tendency database, the operation instruction, the login user information and the plant state information which are transmitted from the user operation instruction transmission means; and
operation tendency comparison means for determining whether the acquired frequency is a predetermined threshold or less,
the authority information transmission means transmits, in a case where it is determined that the acquired frequency is the predetermined threshold or less, the login user information and authority discard information for discarding the authority information in the operation authority database to the operation/monitor device, and
the operation/monitor device discards, in a case where the transmitted authority discard information is received, the authority information, which corresponds to the login user information transmitted together with the authority discard information, from the operation authority database.

4. The plant monitor-control apparatus according to claim 2, wherein the user skill level management device further includes an ideal operation database which stores, in an associated manner, the plant state information indicative of the state of the plant, the operation instruction corresponding to the plant state information, and importance degree information indicative of an importance degree of the operation instruction corresponding to the plant state information;
means for searching the ideal operation database, and acquiring the importance degree which is associated with a series of operation instructions input by the user and the plant state information indicative of the state of the plant at the time when the user inputs the operation instruction, and which corresponds to the series of operation instructions; and means for changing the skill level information in the user skill level information database, which corresponds to the user who inputs the series of operation instructions, on the basis of the acquired importance degree.

5. The plant monitor-control apparatus according to claim 1, wherein the operation/monitor device further includes means for outputting a user skill level display request including the user information, which requests display of the user skill level information, and the user skill level management device further includes:
a user skill level variation history database which stores the user information and a history of the user skill level information in an associated manner;
means for receiving the user skill level display request from the operation/monitor device, searching the user skill level variation history database, and acquiring the history of the user skill level information corresponding to the user information included in the user skill level display request; and
means for displaying the acquired history of the user skill level information.

6. The plant monitor-control apparatus according to claim 1, wherein the operation/monitor device further includes means for outputting a plural user skill level display request including plural user information, which requests display of the user skill level information, and the user skill level management device further includes:
means for receiving the plural user skill level display request from the operation/monitor device, searching the user skill level database, and acquiring skill levels of a plurality of users corresponding to the plural user information included in the plural user skill level display request; and
means displaying the acquired skill levels of the plurality of users.

7. The plant monitor-control apparatus according to claim 2, wherein the operation/monitor device further includes means for outputting a plural user operation tendency display request including plural user information and a plant state, display of which is desired, and the user skill level management device further includes:
means for receiving the plural user operation tendency display request from the operation/monitor device, searching the user operation tendency database, and acquiring the frequency of the operation instruction corresponding to the plural user information in the plant state included in the received plural user operation tendency display request; and
means for displaying, with respect to each user, the acquired frequency of the operation instruction corresponding to the plural user information.

8. The plant monitor-control apparatus according to claim 1, wherein the operation/monitor device outputs emergency state information in a case where an emergency state of the plant is detected, the plant monitor-control apparatus further comprises an operation authority opening device which outputs, in a case where the emergency state information that is output from the operation/monitor device is received, authority information, which indicates permission of only a predetermined safe operation, to the operation/monitor device, and the operation/monitor device further includes means for rewriting, in a case where the authority information is received from the operation authority opening device, the operation authority information, which is stored in the operation authority database, to the authority information which indicates permission of only the predetermined safe operation.

9. A plant monitor-control apparatus comprising:
a control device which controls a to-be-controlled device of a plant;
an operation/monitor device which outputs an operation instruction of the to-be-controlled device to the control device; and
a security management device which includes a database which stores, in an associated manner, identification information and authority information indicating a range of operable to-be-controlled devices, and which reads identification information pre-recorded in an electronic circuit buried in an input key, determines whether the read identification information agrees with the identification information stored in the database, and outputs, when the agreement of the identification information is determined, the authority information, which is stored in association with the identification information the agreement of which is determined, to the operation/monitor device,
wherein the operation/monitor device outputs to the control device only the operation instruction which meets the authority information output from the security management device.

10. The plant monitor-control apparatus according to claim 9, wherein the read of the identification information, which is pre-recorded in the electronic circuit buried in the input key, is executed in a case where the identification information, which is pre-recorded in the electronic circuit buried in the key, agrees with identification information recorded in another information device.

11. The plant monitor-control apparatus according to claim 10, wherein the security management device further includes means for outputting, in a case where the identification information, which is pre-recorded in the electronic circuit buried in the key, is not received for a predetermined time period, the unreceivable identification information and authority discard information, which instructs discard of the operation authority of the unreceivable identification information, to the operation/monitor device, and
the operation/monitor device further includes means for discarding, in a case where the unreceivable identification information and the authority discard information are received from the security management device, the authority information, which is associated with the unreceivable identification information, from the database.

12. The plant monitor-control apparatus according to claim 9, wherein the security management device further includes:
a biometric authentication sensor which acquires biometric authentication data of a user;
means for converting biometric information, which is acquired by the biometric authentication sensor, to identification information; and
means for determining whether the converted identification information agrees with the identification information stored in the database, and outputting, in a case where the agreement of the identification information is determined, the authority information, which is stored in association with the identification information the agreement of which is determined, to the operation/monitor device.

13. A plant monitor-control method in a plant monitor-control apparatus comprising a control device which controls a to-be-controlled device of a plant; an operation/monitor device which outputs an operation instruction of the to-be-controlled device to the control device; and a user skill level management device which outputs, to the operation/monitor device, authority information which defines a range of operations of the plant corresponding to a user skill level of a user of the operation/monitor device,
wherein the operation/monitor device outputs login user information, which indicates the user who completes login, to the user skill level management device,
the user skill level management device includes a user skill level database which stores, in an associated manner, user information, skill level information indicative of a skill level of an operation by the user, and the authority information corresponding to the skill level information, and searches the user skill level database by using the login user information, acquires the authority information corresponding to the login user information, and transmits the acquired authority information, together with the login user information, to the operation/monitor device, and
the operation/monitor device includes an operation authority database which stores the user information and the authority information in an associated manner, searches the operation authority database by using the login user information, acquires operation authority information corresponding to the login user information of the user who inputs the operation instruction, determines whether the input operation instruction meets the range of operations of the plant, which is defined by the operation authority information that is acquired from the operation authority database, and outputs the operation instruction to the control device in a case where it is determined that the input operation instruction meets the range of operations of the plant.

14. A plant monitor-control method in a plant monitor-control system apparatus comprising a control device which controls a to-be-controlled device of a plant; an operation/monitor device which outputs an operation instruction of the to-be-controlled device to the control device; and a security management device which includes a database which stores, in an associated manner, identification information and authority information indicating a range of operable to-be-controlled devices,
wherein the security management device reads identification information pre-recorded in an electronic circuit buried in an input key, determines whether the read identification information agrees with the identification information stored in the database, and outputs, when the agreement of the identification information is determined, the authority information, which is stored in association with the identification information the agreement of which is determined, to the operation/monitor device, and
the operation/monitor device outputs to the control device only the operation instruction which meets the authority information output from the security management device.

* * * * *